United States Patent [19]

Ashi et al.

[11] Patent Number: 5,634,097
[45] Date of Patent: May 27, 1997

[54] VIRTUAL PATH CONNECTOR AND VIRTUAL PATH TRACING METHOD AND APPARATUS

[75] Inventors: Yoshihiro Ashi; Toshihiko Fujita; Hiromi Ueda, all of Yokohama; Haruhiko Matsunaga, Yokosuka, all of Japan

[73] Assignees: Hitachi, Ltd.; Nippon Telegraph and Telephone Corporation, both of Tokyo, Japan

[21] Appl. No.: 27,643

[22] Filed: Mar. 8, 1993

[30] Foreign Application Priority Data

Mar. 6, 1992 [JP] Japan ..................... 4-050059

[51] Int. Cl.[6] ............................. G06F 11/00; H04L 12/56
[52] U.S. Cl. ..................... 395/183.21; 370/248; 370/397
[58] Field of Search ........................... 371/202, 8.1, 8.2, 371/20.1; 370/60, 60.1, 58.1, 94.1, 94.2, 97, 91, 114, 14, 54, 13, 16; 395/183.21, 183.22, 183.01, 185.01

[56] References Cited

U.S. PATENT DOCUMENTS

| 5,084,867 | 1/1992 | Tachibana et al. | 370/60 |
|---|---|---|---|
| 5,241,534 | 8/1993 | Omuro et al. | 370/16 |
| 5,257,311 | 10/1993 | Naito et al. | 370/94.1 |
| 5,265,088 | 11/1993 | Takigawa et al. | 370/58.2 |
| 5,321,688 | 6/1994 | Nakano et al. | 370/110.1 |
| 5,337,307 | 8/1994 | Sato et al. | 370/60 |

OTHER PUBLICATIONS

"A Proposal on a Method for Automated Network Connection Tracing and Data Gathering by Using Overhead Bytes in SDH Frame Structure", Yasuda et al.

"CCITT Recommendation G.709", pp. 1–75.

"Proposed Virtual Path Tracing Function in ATM Networks", by Matsunaga et al.

*Primary Examiner*—Robert W. Beausoliel, Jr.
*Assistant Examiner*—Dieu-Minh Le
*Attorney, Agent, or Firm*—Antonelli, Terry, Stout & Kraus, LLP

[57] ABSTRACT

A method and apparatus of tracing VP's (virtual paths) wherein operational information of VP connectors are collected through OAM (operation and maintenance) cells. The VP connectors establish a connection at a VP level within a network in which the cells are transferred in an ATM (asynchronous transfer mode). Each VP connector detects an OAM cell for VP tracing as received from another of the VP connectors, and judges if an area for affixing the operational information in the VP connector itself exists in the detected OAM cell. In the VP connector when the area exists, the detected OAM cell is specified to be the OAM cell for writing the operational information thereinto, and the specified OAM cell is sent out after affixing the operational information thereto. When the area does not exit, the OAM cell received from the other VP connector is sent out after indicating therein that the received OAM cell is not the rearmost cell, the OAM cell for the VP tracing is generated anew, and the generated cell is sent out after indicating therein that the generated OAM cell is the rearmost cell. Also the operational information is affixed to newly generated OAM cell.

17 Claims, 12 Drawing Sheets

F I G. 1
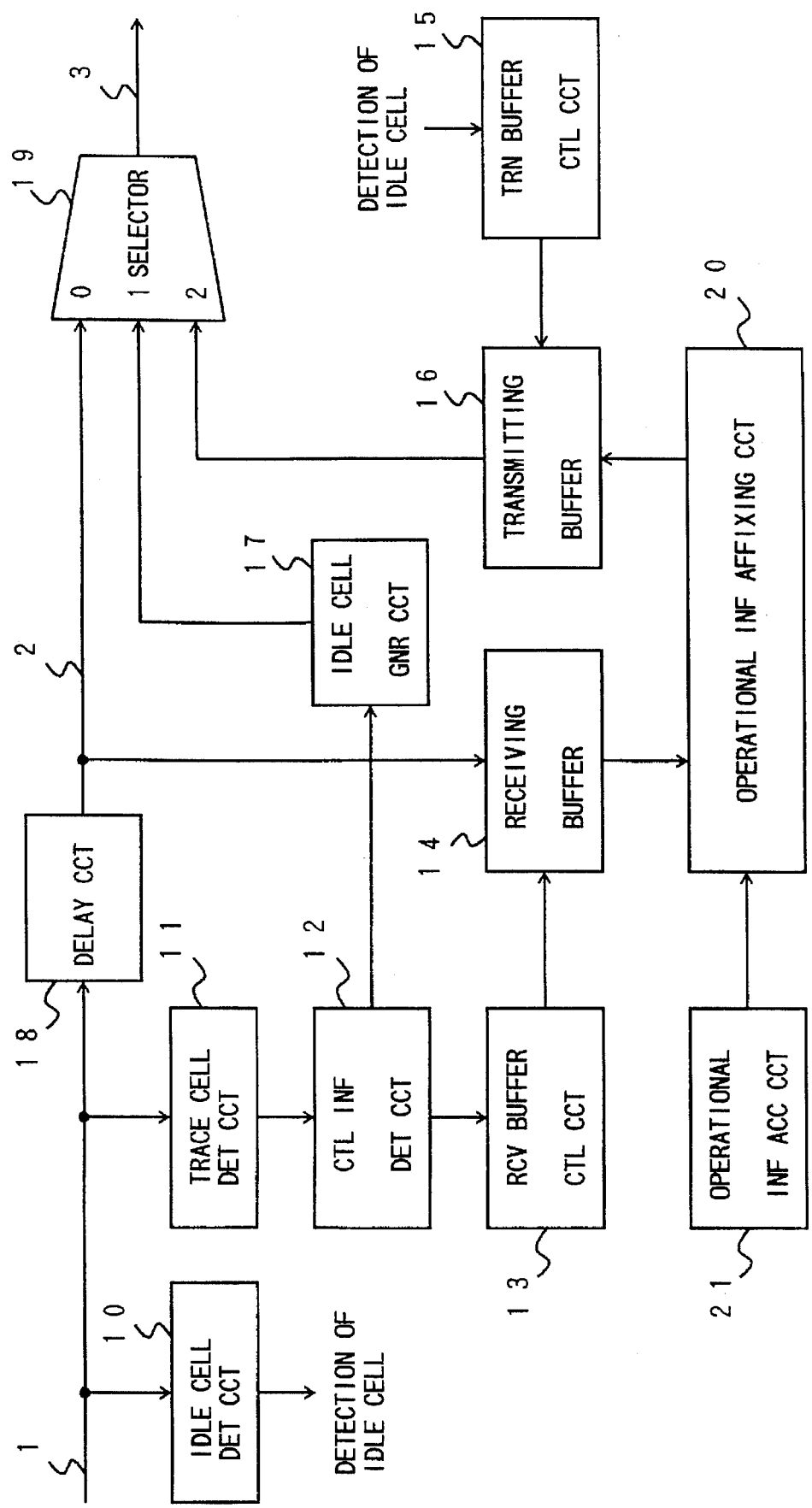

FIG. 12

| ABNORMALITY DETECTING METHOD / ABNORMAL MODE | | METHOD #1 CHECKING ERROR DETECTING CODE | METHOD #2 CHECKING CELL SERIAL No. INF | METHOD #3 CHECKING ERROR FLAG AFFIXATION | METHOD #4 MONITORING TIME-OUT |
|---|---|---|---|---|---|
| LOSS OF TRACE CELL | NON-REARMOST CELL | × | ○ DETECTION OF OMISSION OF SERIAL No. | × | × |
| | REARMOST CELL | × | × | × | ○ DETECTION OF LAPSE OF TIME |
| MIXING OF TRACE CELL | NON-REARMOST CELL | × | ○ DETECTION OF SERIAL No. DUPLICATION | × | × |
| | REARMOST CELL | × | × | × | × |
| ERROR OF TRACE CELL INF | NON-REARMOST CELL | ○ DISAGREEMENT OF DETECTING CODE | × | × | × |
| | REARMOST CELL | ○ DISAGREEMENT OF DETECTING CODE | × | ○ DETECTION OF ERROR FLAG | × |

○ : DETECTABLE   × : UNDETECTABLE 5,634,097

VIRTUAL PATH CONNECTOR AND VIRTUAL PATH TRACING METHOD AND APPARATUS

BACKGROUND OF THE INVENTION

The present invention relates to a virtual path tracing method and apparatus wherein the operational information of virtual paths are collected through OAM (operation and maintenance) cells for the purpose of managing an ATM (asynchronous transfer mode) network architecture.

A known path tracing method intended to manage a network architecture is a method based on an SDH (synchronous digital hierarchy) which is defined in "CCITT (Comité Consultatif International Télégraphique et Téléphonique) Recommendation G. 709". A detailed paper concerning the path tracing of SDH is 'Yasuda et al.: "Proposal of Method of Tracing Connection System and Automatically Collecting Network Equipment Data by Utilizing SDH Frame Structure", Technical Bulletin of the Institute of Electronics, Information and Communication Engineers of Japan, IN90-50, pp. 31–36'.

The path tracing method in the SDH will be explained with reference to FIGS. 8 and 9 of the accompanying drawings.

FIG. 8 illustrates the format and arrayal of path trace information in the SDH. In the SDH path tracing, the path trace information are affixed to overhead areas of predetermined time slots and are iteratively transmitted by a path terminator located on a transmitting side. Shown in FIG. 8 is only the arrayal of the path trace information (of J1 [bytes]) in the path terminator. The path trace information denoted by numeral 100 is formed of a series of character data of 64 [bytes], and it bears logical name information 102 in the path terminator. Besides, a delimiter 101 for indicating the break of the character data series is affixed at the tail of this series. Since the end of the path trace information is indicated by the delimiter 101, the path trace information 100 can also be set as character data exceeding 64 [bytes]. In addition, symbols (#k–1), (#k), (#k+1), (#k+2), . . . annexed to the path trace information signify that the same information is iteratively output. The logical name information 102 is indicated in VC-3 (virtual container 3) unit and VC-4 unit. The expressions "VC-3" and "VC-4" indicate the hierarchical levels of digital transmission. By way of example, the level VC-3 corresponds to a transmission rate of 50 [MBPS], and the level VC-4 a transmission rate of 150 [MBPS].

FIG. 9 illustrates the form in which the path tracing in the SDH is realized. Shown in the figure is a construction in which the path trace information is transmitted from the path terminator 110 located on the transmitting side and is received by a path terminator 114 via a VC-3/VC-4 path network 113. In the path terminator 110 on the transmitting side, a path trace information generating circuit 112 is previously furnished with information on a logical name and attributes. The circuit 112 generates the path trace information shown in FIG. 8 on the basis of the given information, and it inserts the generated information into the path overhead of J1 [bytes] via a transmitting-side path terminating circuit 111. A receiving-side path terminating circuit 115 included in the path terminator 114 on a receiving side, separates the path trace information of J1 [bytes], detects the delimiter 101 indicating the break of the character data series and regenerates the character data series of 64 [bytes]. Further, a path trace information checking circuit 116 collates the received and regenerated character data series with the logical name and attributes of the transmitting side given as expected values beforehand. In a case where the paths at the VC-3 and VC-4 levels are correctly connected, the received path trace information agrees with the expected values. On the other hand, in a case where the paths are erroneously connected, the received path trace information disagrees with the expected values.

In the SDH in which the information is transmitted in an STM (synchronous transfer mode), the normalcy of the path connection between a transmitting-side path termination point and a receiving-side path termination point is acknowledged by the method stated above.

Next, a method of tracing paths in an ATM (asynchronous transfer mode) will be stated as the second prior-art technique. The ATM has a management unit called a "virtual path (VP)", in correspondence with the virtual container of the SDH. With the ATM, in managing a network in VP unit, operation and maintenance information is transferred using an OAM (operation and maintenance) cell as fundamentally stipulated by CCITT Recommendation I. 610. According to the fundamental principle, it is considered that the trace information of the virtual path will also be transferred on a cell basis by the use of the OAM cell. By the way, in the ensuing explanation, the function of tracing the virtual path shall be shortly called the "VP tracing", while the OAM cell which is used for tracing the virtual path shall be called the "VP tracing cell".

FIG. 10 illustrates the form in which the VP tracing function is realized, and which is naturally derived from the above premises. The form shown in FIG. 10 is the same as stated in 'Matsunaga et al.: "Proposal of Virtual Path Tracing System in ATM Network", Lecturing thesis B-482, the Autumn National Meeting of the Institute of Electronics, Information and Communication Engineers of Japan, 1991'. In FIG. 10, four VP connectors 120~123 are arranged between the first VP terminator 124 and the second VP terminator 125. These VP terminators 124 and 125 are devices which terminate the virtual paths, and each of which is an ATM exchange, an ATM terminal, or the like. On the other hand, the VP connectors 120~123 are devices which set the route of the cells in virtual path unit, and each of which is an ATM cross connection device or the like. Identification Nos. (XC-ID) are affixed to the VP terminators 124 and 125 in advance. An operating system (hereinbelow, expressed as "OpS") 126 is connected to the VP connector 120 serving as the start point of the paths and to the VP connector 123 serving as the end point of the paths. The OpS 126 is a control center for operating and maintaining the ATM network. By way of example, the OpS 126 can perform the continuity test of the VP's, acknowledge the route of the VP's and update the database of the network architecture management.

Now, the operation of tracing the virtual paths in the construction shown in FIG. 10 will be explained.

First, a command for performing the VP tracing is sent from the OpS 126 to the VP connector 120. Upon receiving the command, the VP connector 120 generates a VP tracing cell 130. It writes the operational information a of its own into the generated cell, and thereafter sends out the resulting cell as a VP tracing cell 130 to the ATM network. The VP connector 121 discriminates the cell 130 received from the VP connector 120, as the VP tracing cell, and it separates and holds this VP tracing cell 130. Further, it affixes the operational information b of its own to the VP tracing cell 130 and thereafter sends out the resulting cell as a VP tracing cell 131 to the succeeding stage. The VP connector 122 operates similarly to the VP connector 121. The VP connector 123 discriminates a cell 132 received from the VP connector 122, as the VP tracing cell, and it separates and holds this VP tracing cell 132. Further, it affixes the operational information d of its own to originate network operating information 133 and sends the resulting cell back to the OpS 126.

In this way, the operational information at the respective nodes of the ATM network can be read into the operating system 126 which integratively controls the network.

The individual VP connectors for executing the VP tracing shall be classified into three types and have their appellations defined as follows:

① Tracing start point;

Intended to mean the VP connector which generates the VP tracing cell and then sends it out to the ATM network at the command of the OpS 126. In FIG. 10, the VP connector 120 corresponds to this type.

② Tracing relaying point;

Intended to mean the VP connector which separates the VP tracing cell from the ATM network, and which writes the operational information of its own into the separated cell and thereafter sends out the resulting cell to the ATM network again. In FIG. 10, the VP connectors 121 and 122 correspond to this type.

③ Tracing end point;

Intended to mean the VP connector which separates the VP tracing cell from the ATM network, and which informs the OpS 126 of the operational information borne in the separated cell. In FIG. 10, the VP connector 123 corresponds to this type.

Of the two prior-art techniques stated above, the first one which is the path tracing method utilizing the path overhead has the drawback that a section for executing the path tracing is so limited as to extend between the termination points of the VC-3 or the VC-4. Therefore, this method is not applicable to the tracing of the virtual paths (the VP tracing) in the ATM network.

On the other hand, the second prior-art technique which is the method employing the VP tracing cells is problematic as stated below. As compared with the conventional STM network, the ATM network is subject to the dynamic change of the network architecture. When this condition is considered, the VP tracing requires, not only the function of acknowledging the continuity between the VP termination points, but also the function of collecting the information on the route of the VP's. In the explanation of the second prior-art technique, this function corresponds to the operations of writing the operational information of the VP connectors into the VP tracing cells and finally informing the operating system of the written operational information. To be noticed here is the fact that the total value of the operational information of the VP connectors, which belong to the route of the VP's to be traced, can exceed the capacity of the payload of each cell. The "payload" of the cell signifies the area of the cell except the header part thereof. Since the length of the cell is fixed to 53 [bytes], the payload area is limited to the capacity of 48 [bytes]. In spite of the limited capacity, the operational information are affixed at the respective VP connectors, so that the total value thereof can become greater than the capacity of the payload of the cell. In carrying out the VP tracing, therefore, the operational information of the VP connectors need to be divided and be distributively borne by a plurality of VP tracing cells. In the aforementioned thesis "Proposal of Virtual Path Tracing System in ATM Network", the necessity of pluralizing the VP tracing cell is referred to, but a concrete processing algorithm is not presented.

The principal problems to be solved in realizing the processing algorithm are as follows:

(1) Method of specifying a VP tracing cell to have operational information written thereinto, among pluralized VP tracing cells.

(2) Decisional condition for pluralizing a VP tracing cell, and method of pluralizing the VP tracing cell.

(3) Method of deciding the end of VP tracing.

(4) Methods of coping with the error and loss of a VP tracing cell.

SUMMARY OF THE INVENTION

In consideration of the above-described problems, the present invention has for its object to provide a VP connector which is endowed with an efficient processing algorithm for dividing the operational information of VP connectors and bearing the divided operational information in a plurality of VP tracing cells distributively.

The present invention for solving the above-described problems provides a VP (virtual path) connector in an ATM (asynchronous transfer mode) network system having a plurality of VP connectors, each of which includes operational information affixation apparatus for affixing operational information to an OAM (operation and maintenance) cell received from another of the VP connectors and then sending out the resulting OAM cell to yet another of the VP connectors in order to establish a connection at a VP level and then perform processing for tracing VP's within a network wherein such cells are transferred in the ATM. The VP connector includes specification apparatus for specifying the OAM cell into which the operational information is to be written by the VP connector. The specification apparatus includes a detector for detecting the rearmost OAM cell received from the other VP connector, and judgement apparatus for judging if an area for affixing the operational information in the VP connector itself exists in the detected OAM cell. When the area exists, the judgement apparatus specifies said detected OAM cell to be the OAM cell for writing the operational information thereinto and then directs the operational information affixation apparatus to affix the operational information, whereas when the area does not exist, the judgement apparatus notifies the operational information affixation apparatus of the nonexistence of the area. The operational information affixation apparatus when directed affix the operational information by the judgement apparatus, the operational information to the specified OAM cell and then sends out the resulting OAM cell, and when notified of the nonexistence of the area by the judgement apparatus, indicates in the OAM cell received from the other VP connector that the received OAM cell is not the rearmost cell, and then sends out the resulting OAM cell, to generate the OAM cell for the VP tracing anew, to indicate in the OAM cell generated anew that the generated cell is the rearmost cell, and to affix said operational information to the generated cell and then send out the resulting cell.

The operational information affixation apparatus can affix serial No. information to the OAM cell for the VP tracing.

When the OAM cell is generated anew, the operational information affixation apparatus refers to serial No. information of the OAM cell received from the other VP connector and then affixes the serial No. information to the OAM cell for the VP tracing.

The VP connector further includes end apparatus for ending the trace processing upon arrival of the rearmost OAM cell, whereby it can operate as a VP connector located at an end point of the VP tracing.

Also, the end apparatus ends the trace processing even in a case where the rearmost OAM cell does not arrive when a predetermined time period has lapsed since acceptance of a command for starting the tracing. Further, the operational information affixation apparatus can affix error detection information for detecting any error of the OAM cell under the trace operation, to the OAM cell and the operational information affixation apparatus can refer to the error detection information of the OAM cell, to judge whether or not the OAM cell has undergone the error in the previous trace operation, and it can affix information indicative of the presence or absence of the error to the OAM cell.

An ATM (asynchronous transfer mode) network system having a plurality of VP (virtual path) connectors as stated above can include as the VP connectors, a tracing starting VP connector which accepts a command for starting the tracing, and which affixes operational information for tracing the VP's as contained in the VP connector itself, to the OAM (operation and maintenance) cell and then sends out the resulting OAM cell a tracing relaying VP connector which detects the OAM cell for tracing the VP's as received from another of the VP connectors, which operates when an area for affixing operational information contained in the VP connector itself exists in the detected OAM cell, to affix the operational information to the detected OAM cell and then sends out the resulting OAM cell, and which operates when the area does not exist, to indicate in the received OAM cell that the received OAM cell is not the rearmost cell, and then sends out the resulting OAM cell, to generate the OAM cell anew, to indicate in the OAM cell generated anew that the generated cell is the rearmost cell, and to affix the operational information to the generated cell and then sends out the resulting cell and a tracing ending VP connector which detects the OAM cell for tracing the VP's as received from another of the VP connectors, which ends the trace processing upon arrival of the rearmost OAM cell, and which derives and delivers the operational information of the OAM cells up to the rearmost OAM cell. In addition, the tracing starting VP connector affixes information indicative of a serial No. to the OAM cell for tracing the VP's and then sends out the resulting OAM cell. The tracing relaying VP connector refers to the serial No. information of the OAM cell received from the first-mentioned other VP, and affixes information indicative of a serial No. of the generated OAM cell and then sends out the resulting OAM cell in the case of having generated the OAM cell anew, and the tracing ending VP connector refers to the serial No. information of the OAM cells received from the other VP's, to judge if the OAM cells up to the rearmost OAM cell have arrived in conformity with the serial Nos., and it derives and delivers the operational information of the OAM cells up to said rearmost OAM cell when said serial Nos. are conformed to, whereas it gives notice of an abnormal end when not.

In operation, in order to indicate that the OAM cell generated anew is the rearmost cell, the operational information affixation apparatus can use, for example, an end flag. Thus, the VP tracing cell into which the operational information is to be written can be specified by referring to the end flag.

The end apparatus can derive and deliver the operational information of the OAM cells up to the rearmost OAM cell. Alternatively, the end apparatus can end the trace processing when the rearmost OAM cell has not arrived after the lapse of the predetermined time period.

When the serial No. information is affixed to the OAM cell for the virtual path tracing, the end apparatus can detect the loss of the OAM cell.

Further, when the error detection information is used, the operational information affixation apparatus can affix the information indicative of the presence of the error, and the end apparatus can deliver an abnormal end output.

BRIEF DESCRIPTION OF THE DRAWINGS

FIG. 1 is a block diagram of a VP (virtual path) trace processing circuit showing the first embodiment of the present invention;

FIG. 12 is a diagram for explaining the corresponding relations between abnormal modes in the trace processing and methods of detecting the abnormal modes.

PREFERRED EMBODIMENTS OF THE INVENTION

Figure 2:
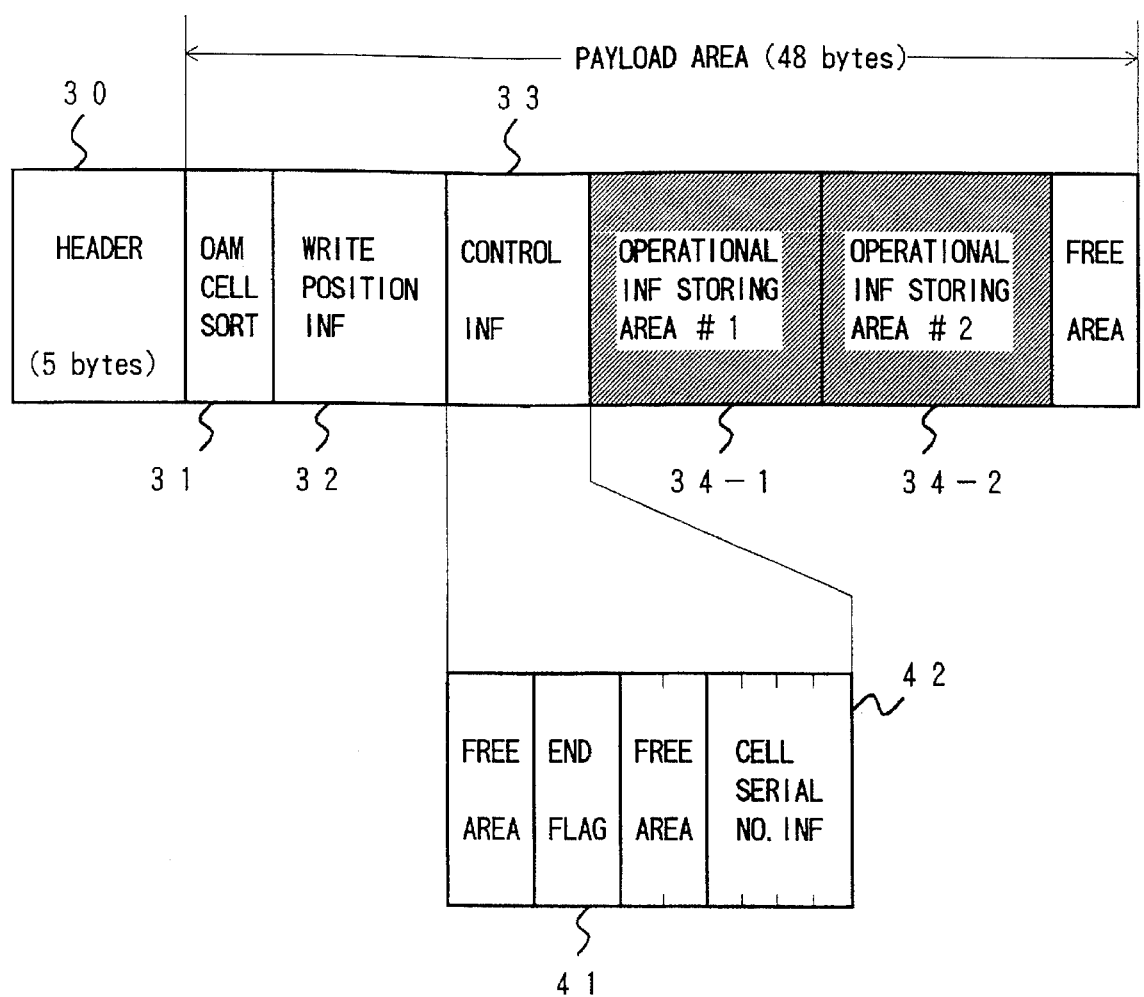
FIG. 2 is a diagram showing a cell format in the first embodiment.

Now, the embodiments of the present invention will be described with reference to the accompanying drawings.

FIG. 1 is a block diagram of a VP (virtual path) trace processing circuit showing the first embodiment. In order to perform the processing of a tracing relaying point, the VP trace processing circuit in this embodiment includes all circuits for realizing the function of separating a VP tracing cell, the function of writing operational information, and the function of sending out the VP tracing cell. This VP trace processing circuit can be assembled in a VP connector.

The arrangement of the VP trace processing circuit in this embodiment will be first explained. The VP trace processing circuit illustrated in FIG. 1 has three major functional blocks.

The first block is a group of circuits for realizing the function of separating the VP tracing cell. It includes a trace cell detecting circuit 11, a control information detecting circuit 12, an idle cell (or vacant cell) generating circuit 17, a receiving buffer control circuit 13 and a receiving buffer 14. Among these circuits, the trace cell detecting circuit 11 is connected to an input highway 1 and has the function of detecting the VP tracing cell from within a cell stream in the input highway 1. The control information detecting circuit 12 detects the VP tracing cell into which the operational information is to be written in the VP trace processing circuit. The idle cell generating circuit 17 generates and delivers an ATM (asynchronous transfer mode) cell when the control information detecting circuit 12 has detected the VP tracing cell for writing the operational information thereinto. The receiving buffer control circuit 13 directs the receiving buffer 14 to hold the VP tracing cell for writing the operational information thereinto (the operation of separating the VP tracing cell), when the control information detecting circuit 12 has detected the VP tracing cell. The receiving buffer 14 is connected to an internal highway 2 (within the VP trace processing circuit), the signal of which is obtained by delaying the signal of the input highway 1. This buffer 14 has the function of receiving and accumulating the VP tracing cells under the control of the receiving buffer control circuit 13.

The second block is a group of circuits for realizing the function of writing the operational information into the VP tracing cell. It includes an operational information affixing circuit 20 and an operational information accumulating circuit 21. The operational information affixing circuit 20 executes a process for writing the operational information into the VP tracing cell, and it is connected to the receiving buffer 14 and a transmitting buffer 16 in order to transfer the information of the VP tracing cell. On the other hand, the operational information accumulating circuit 21 generates and accumulates the operational information. The operational information is path trace information which contains a logical name, attributes, etc.

The third block is a group of circuits for realizing the function of sending out the VP tracing cell. It includes an idle cell (or vacant cell) detecting circuit 10, a transmitting buffer control circuit 15 and the transmitting buffer 16. Among these circuits, the idle cell detecting circuit 10 is connected to the input highway 1, and it has the functions of detecting an idle cell from within the cell stream in the input highway 1 and informing the transmitting buffer control circuit 15 of the detection of the idle cell. The idle cell is a vacant cell from within the cell stream in the input highway 1 or a vacant cell generating in a VP connector. The transmitting buffer 16 accumulates the VP tracing cells generated by the operational information affixing circuit 20. When the idle cell has been detected by the idle cell detecting circuit 10, the transmitting buffer control circuit 15 directs the transmitting buffer 16 to send out the accumulated VP tracing cell instead of the idle cell (the operation of sending out the VP tracing cell).

The other circuits are a delay circuit 18 and a 3-1 selector 19, which are shared by the function of separating the VP tracing cell and the function of sending it out. The delay circuit 18 has the input highway 1 connected thereto, and it delays the signal of the input highway 1 for a predetermined time period and then delivers the delayed signal to the internal highway 2. The delay time of the delay circuit 18 is set by considering time periods which are required for the operations of the trace cell detecting circuit 11, control information detecting circuit 12 and receiving buffer control circuit 13. The 3-1 selector 19 functions to select one output signal for three input signals, and the selected signal is delivered to an output highway 3. The 0th input terminal of the 3-1 selector 19 has the internal highway 2 connected thereto, and it is normally selected as the basic route of the signal. The 1st input terminal has the output of the idle cell generating circuit 17 connected thereto, and it is selected for the operation of separating the VP tracing cell. The 2nd input terminal has the output of the transmitting buffer 16 connected thereto, and it is selected for the operation of sending out the VP tracing cell. Although not shown in FIG. 1, instructions for the selections of the 3-1 selector 19 are given by, e.g., the receiving buffer control circuit 13 and the transmitting buffer control circuit 15.

Next, there will be explained the format of the VP tracing cell which is processed by the VP trace processing circuit of the first embodiment. FIG. 2 illustrates an example of the format of the VP tracing cell. This VP tracing cell has a cell length of 53 [bytes], and it is composed of a header 30 being 5 [bytes] long and a payload area being 48 [bytes] long. The payload area includes OAM (operation and maintenance) cell sort information 31, write position information 32, control information 33, and operational information storing areas 34-1 and 34-2. In more detail, the control information 33 contains an end flag 41 and cell serial No. information 42. The header 30 is endowed with such information as indicates whether the pertinent cell is a user cell or the VP tracing OAM cell, in terms of a specified value. The OAM cell sort information 31 is endowed with predetermined information which indicates a cell sort such as the VP tracing cell, a transmission quality notifying cell or a fault notifying cell. The write position information 32 indicates whether or not the operational information is written into at least one of the operational information storing areas 34-1 and 34-2. The end flag 41 of the control information 33 indicates that the pertinent cell is the last one of the VP tracing cells. Owing to the end flag 41, the VP tracing cell into which the operational information is to be written is specified from among the pluralized VP tracing cells. The cell serial No. information 42 indicates the serial No. information of the VP tracing cell. Each of the operational information storing areas 34-1 and 34-2 indicates the operational information which one VP connector affixes. According to the cell format in this embodiment, the operational information of two VP connectors can be borne in one VP tracing cell.

Figure 3:
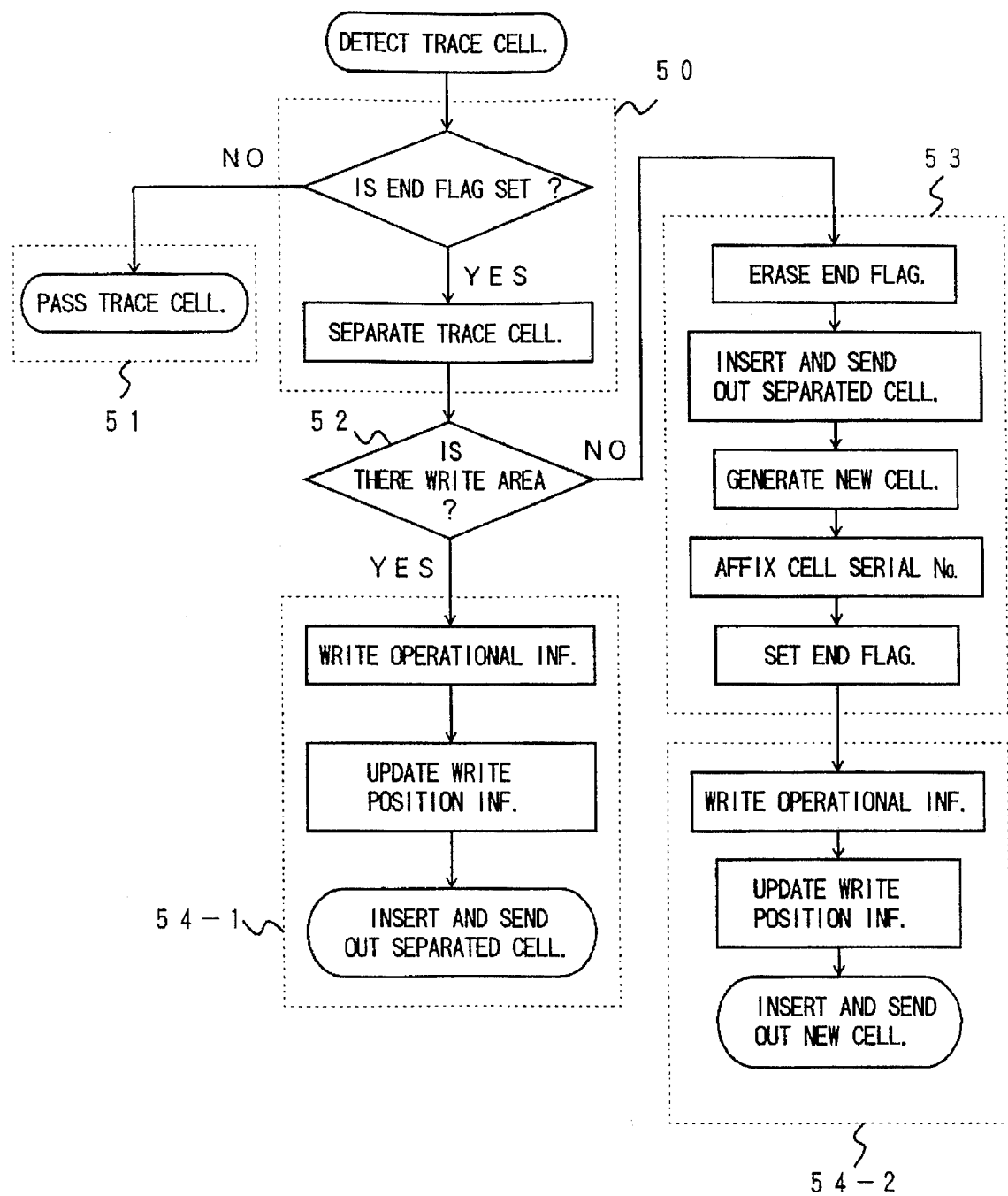
FIG. 3 is a flow chart showing an operational information writing process in the first embodiment.

The operation of the VP trace processing circuit of the first embodiment will be explained with the above contents taken into account. FIG. 3 illustrates the flow of an operational information writing process in the first embodiment. The processing flow in FIG. 3 is broadly classified into an information writing cell-specifying process 50, a VP tracing cell-passing process 51, a write area deciding process 52, a VP tracing cell-dividing process 53, and operational information writing processes 54-1 and 54-2. The processing from the reception of the VP tracing cell till the sending thereof will be explained below in relation to the individual processes:

(1-1) Information writing cell-specifying process 50;

In the information writing cell-specifying process 50, there is indicated a processing method which corresponds to the method (mentioned as the problem (1) before) of specifying the VP tracing cell to have the operational information written thereinto, among the pluralized VP tracing cells. As an expedient for solving the first problem, the end flag expressive of the rearmost cell as borne in the detected cell is referred to, whereby the VP tracing cell into which the operational information is to be written is specified among the pluralized VP tracing cells.

First of all, the trace cell detecting circuit 11 detects whether or not the cell within the received cell stream is the VP tracing cell, by reference to the header 30 and the OAM sort information 31. In the case of the VP tracing cell, the control information detecting circuit 12 decides whether or not the pertinent cell is the rearmost one, by reference to the end flag 41 contained in the control information 33 of the cell. In the case where the received VP tracing cell is the rearmost one, the control information detecting circuit 12 separates the pertinent cell from within the cell stream in the input highway 1, and it directs the receiving buffer control circuit 13 to accumulate the separated cell in the receiving buffer 14. Simultaneously, the control information detecting circuit 12 directs the idle cell (or vacant cell) generating circuit 17 to insert the generated idle cell through the 3-1 selector 19, thereby to convert the VP tracing cell into the idle cell and to send out the latter to the output highway 3. Thereafter, the process 50 is followed by the write area deciding process 52. On the other hand, in the case where the received cell is not the rearmost one, the step of referring to the end flag 41 is unconditionally followed by the VP tracing cell-passing process 51.

In the case where the VP tracing cell has been pluralized, the cell to have the operational information of the VP connector written thereinto is only one of the plurality of cells and is the VP tracing cell generated last. Accordingly, the VP tracing cell into which the operational information is to be written can be specified in such a way that, as in the above processing, the information indicative of the VP tracing cell generated last, namely, the end flag 41 is contained in the VP tracing cell and is referred to at the tracing relaying point.

(1-2) VP tracing cell-passing process 51;

In the case where the received VP tracing cell is not the rearmost one, it is subjected to quite no processing and is passed to the succeeding stage via the 3-1 selector 19, whereupon sufficient whole processing is ended. That is, the 3-1 selector 19 allows the cell to pass therethrough when no selection instruction is given by the control information detecting circuit 12 or the transmitting buffer control circuit 15.

By the way, in the case where the received cell is not the VP tracing cell, it is passed before entering the operational information writing process.

(1-3) Write area deciding process 52;

In the write area deciding process 52, there is indicated a processing method which corresponds to the decisional condition (mentioned at the anterior part of the problem (2) before) for pluralizing the VP tracing cell. As an expedient for solving the problem, it is set as the condition for pluralizing the VP tracing cell that a remaining area sufficient to write the operational information thereinto does not exist in the rearmost cell.

Here, the operational information affixing circuit 20 decides whether or not the area for writing the operational information thereinto remains in the separated VP tracing cell, by reference to the status of the write position information 32 of this cell. In a case where the write area remains, the process 52 is followed by the operational information writing process 54-1. On the other hand, in the case where the write area does not remain, the process 52 is followed by the VP tracing cell-dividing process 53. In this manner, the case where the operational information writing area does not remain in the rearmost cell is set as the condition for pluralizing the VP tracing cell.

(1-4) VP tracing cell-dividing process 53;

In the VP tracing cell-dividing process 53, there is indicated a processing method which corresponds to the pluralizing method (mentioned at the posterior part of the problem (2) before). As an expedient for solving the problem, the end flag is rewritten to turn the rearmost cell into a non-rearmost cell, which is then sent out to the VP connector at the succeeding stage, and the rearmost cell bearing the end flag indicative of the very rearmost cell is generated anew, whereby the VP tracing cell is pluralized.

More specifically, the operational information affixing circuit 20 rewrites the end flag 41 of the separated VP tracing cell so as to indicate the non-rearmost cell, and the resulting cell is sent out to the output highway 3 through the transmitting buffer 16 as well as the 3-1 selector 19. On that occasion, in a case where the idle cell has been detected within the received cell stream of the input highway 1 by the idle cell detecting circuit 10, the VP tracing cell is sent out in the form in which the detected idle cell is replaced with the VP tracing cell. Subsequently, the new VP tracing cell is generated in the operational information affixing circuit 20, the cell serial No. information is affixed to this cell, and the end flag 41 of this cell is set so as to indicate the rearmost cell. The cell serial No. information is affixed by monitoring the number of the passed VP tracing cells or the serial No. information of the separated VP tracing cell. The above processing is followed by the operational information writing process 54-2.

(1-5) Operational information writing process 54-1 or 54-2;

The operational information of the pertinent VP connector is written into the unused operational information storing area 34-1 or 34-2 of the VP tracing cell which has been separated or generated anew. Subsequently, the write position information 32 is rewritten in accordance with the situation of use of the operational information storing area (s). By way of example, the write position information 32 indicates which of the operational information storing areas is used. Thereafter, the VP tracing cell is sent out through the transmitting buffer 16 as well as the 3-1 selector 19 in the form in which the idle cell and the VP tracing cell are replaced with each other, in the same manner as in the case of the VP tracing cell-dividing process 53. After the above processing, the operational information writing process is entirely ended.

As understood from the processing contents explained above on the individual processes, the operational information writing flow of the first embodiment makes it possible to specify the VP tracing cell for writing the operational information thereinto, to write the operational information, and to divide the VP tracing cell into the plurality of cells. Thus, the VP tracing cell can be pluralized.

Next, the operation timings of the VP trace processing circuit of the first embodiment will be explained in the sense of supplementing the description based on the processing flow.

Figure 4:
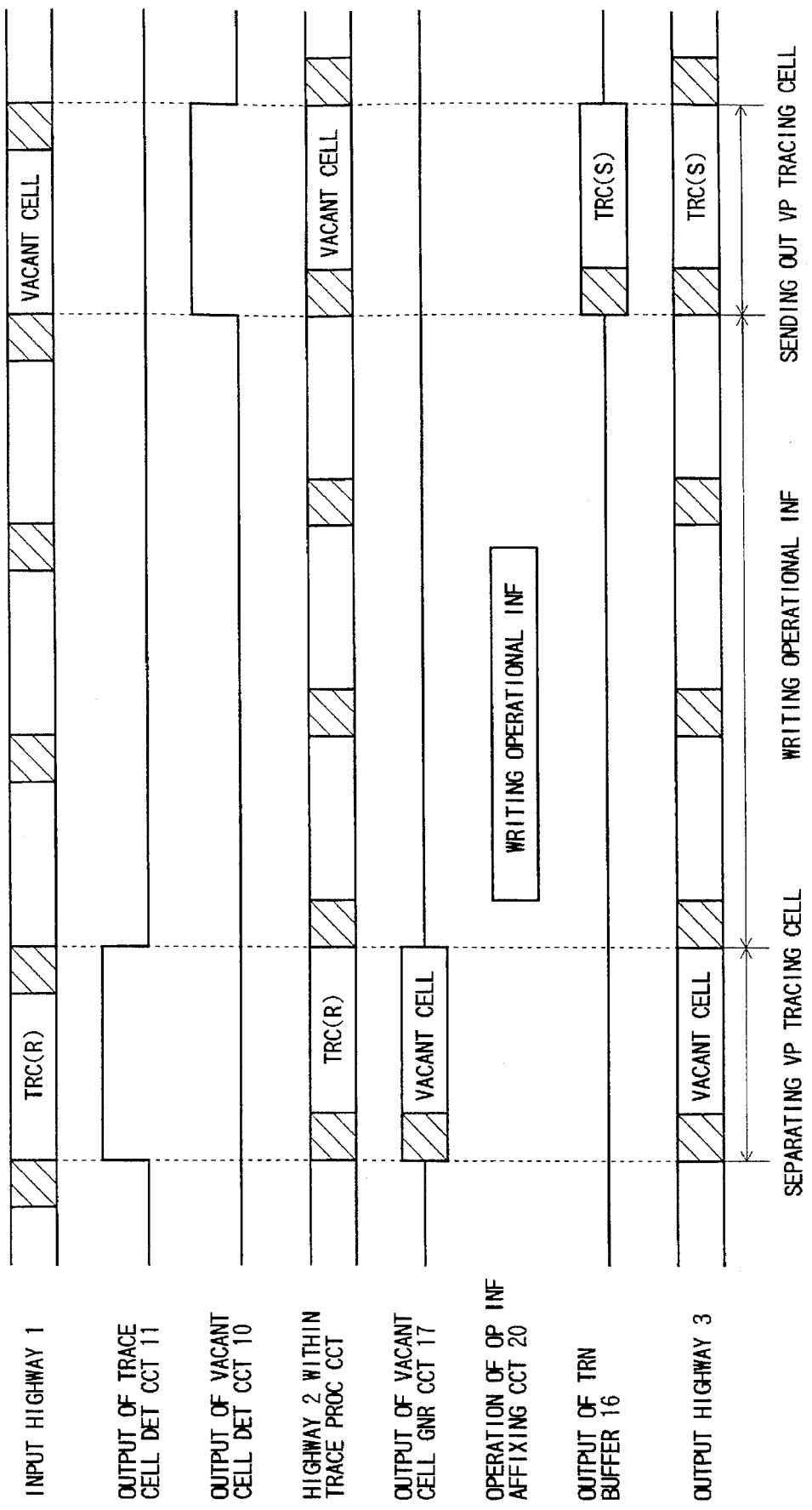
FIG. 4 is a diagram for explaining the operation timings of the VP trace processing circuit in the first embodiment.

FIG. 4 illustrates the operation timings of the VP trace processing circuit of the first embodiment. The signal waveform of the input highway 1 shown in FIG. 4 indicates that periodical cell streams are input. Here, each section headed by a hatched part is the signal corresponding to one cell. The hatched part includes the header 30, OAM cell sort information 31, write position information 32 and control information 33 of the cell depicted in FIG. 2. The output of the trace cell detecting circuit 11 shown at the next row indicates the detected state of the VP tracing cell (abbreviated to "TRC" in the illustration). Further, the output of the idle cell detecting circuit 10 indicates the detected state of the idle cell. In the illustration, as to any of outputs, the detected state and undetected state thereof are respectively denoted by an H (high) level and an L (low) level. The output waveform of the trace cell detecting circuit 11 features that the change point of the signal indicating the detection of the pertinent cell corresponds to the trailing edge of the hatched part. This is based on the requisite that the header 30 and OAM cell sort information 31 of the cell must be referred to for the purpose of discriminating the VP tracing cell, and the requisite that the end flag 41 contained in the control information 33 must be referred to in specifying the VP tracing cell to-be-separated. In order to properly accumulate the VP tracing cell in the receiving buffer 14, accordingly, the signal of the input highway 1 is delayed by the delay circuit 18, and the timing of the receiving buffer 14 for inputting the cell is brought into agreement with the output timing of the trace cell detecting circuit 11 stated above. This situation is indicated by the signal waveform of the internal highway 2 (within the trace processing circuit) shown in FIG. 4. The timing at which the idle cell is delivered from the idle cell generating circuit 17, and the timing at which the VP tracing cell TRC(S) bearing the operational information is sent out from the transmitting buffer 16, are the same as the timings of the cell streams of the internal highway 2. The timings are easy of realization for the reasons that the idle cell detecting circuit 10 precedes the delay circuit 18, and that the detection of the idle cell can be effected merely by referring to the header 30 of the cell.

As thus far explained, the VP trace processing circuit of the first embodiment can be implemented also on the operation timings.

Figure 5:
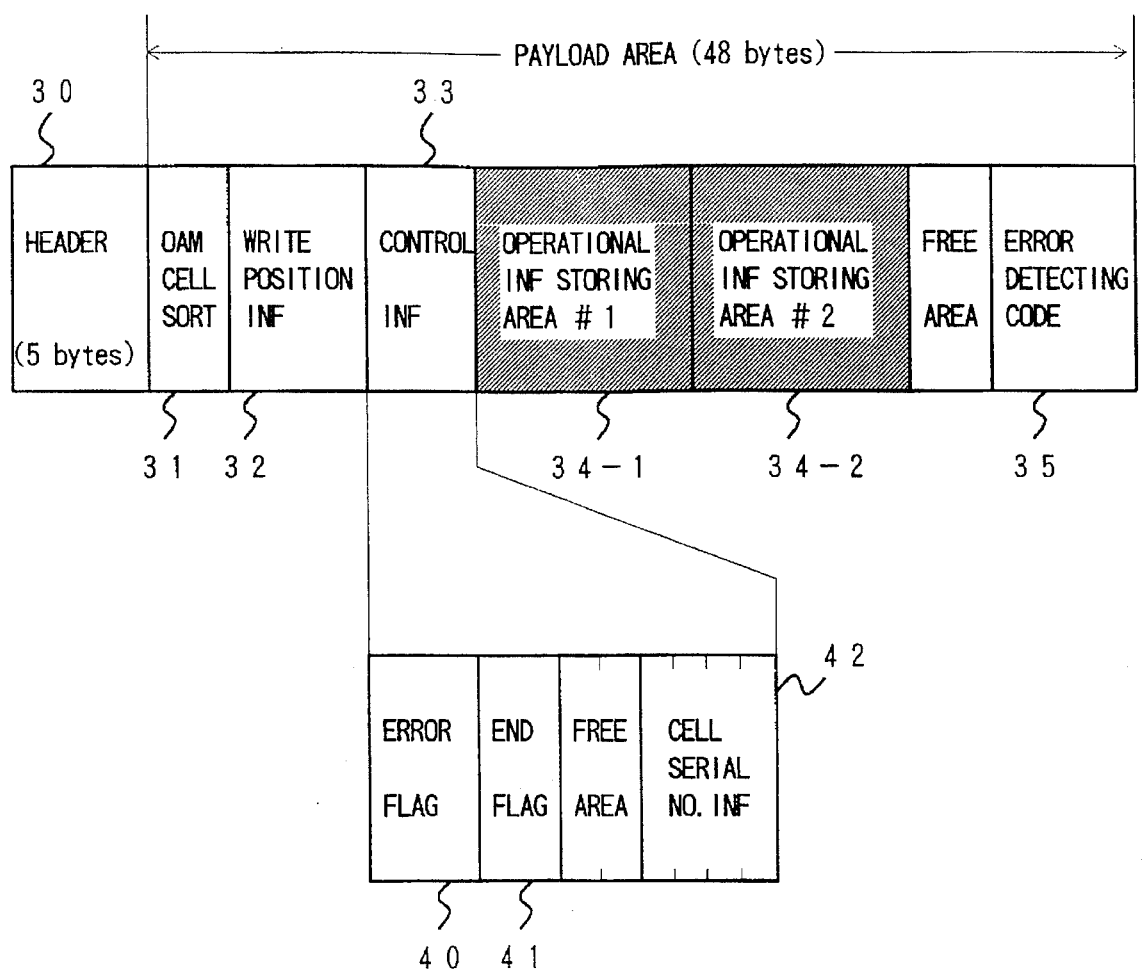
FIG. 5 is a diagram showing a cell format in the second embodiment of the present invention.

Now, the second embodiment will be described in conjunction with FIGS. 5 and 6. As explained above, the flow of the operational information writing process of the first embodiment illustrated in FIG. 3 can fulfill the basic functions of specifying the VP tracing cell to have the operational information written thereinto, writing the operational information into the VP tracing cell, and dividing the VP tracing cell into the plurality of cells. The flow of the operational information writing process of the second embodiment in the ensuing description is such that, in adaptation to an actual ATM network, the function of protection against any error of the VP tracing cell is added to the basic functions realized by the first embodiment. That is, the second embodiment consists in expedients for coping with the error and loss of the VP tracing cell (mentioned as the problem (4) before).

Also the second embodiment concerns the flow of the operational information writing process at the tracing relaying point. An operational information process at a tracing ending point will be explained later.

The following three events are considered as abnormal modes in which errors in the operation of transferring the VP tracing cell develop in the ATM network:

① Loss of Trace cell;

Event in which the VP tracing cell to be transferred is discarded or misdelivered in a VP connector located midway and fails to reach the tracing ending point.

② Mixing of Trace cell;

Event in which the VP tracing cell irrelevant to the intended VP trace processing mixes into a VP connector located midway and reaches the tracing ending point.

③ Error of Trace cell information;

Event in which the VP tracing cell errs during its transfer through the VP connector and reaches the tracing ending point with an erroneous payload part.

The corresponding relations of the aforementioned three abnormal modes with methods of detecting them are tabulated in FIG. 12.

The error of the trace cell information can be detected by operating and collating an error detecting code and collating an error flag contained in the VP tracing cell.

The loss of the non-rearmost cell can be detected because of the omission of serial No. in the collation of the cell serial No. information. Besides, the loss of the rearmost cell can be detected as time-out based on the fact that the rearmost cell does not arrive in spite of the lapse of a predetermined time period.

The mixing of the non-rearmost cell can be detected because of the duplication of serial Nos. in the collation of the cell serial No. information. On the other hand, the mixing of the rearmost cell signifies the mixing of that VP tracing cell of another system which has the same VPI (VP identification) No. as a VPI No. being the subject of the VP tracing. Accordingly, this abnormality occurs very rarely, and the exemption thereof from the abnormalities to-be-detected will pose no problem.

In this manner, as the solution to the fourth problem mentioned before, in the VP connector at the tracing ending point, the collected operational information are decided valid in a case where the reception sequence of the received OAM cell is consistent with the cell serial No. information borne in this cell, where the termination result of the error detecting code borne in the OAM cell is normal, and where the trace processing has ended with the arrival of the rearmost OAM cell at the VP connector serving as the final point of the tracing. Besides, at the tracing relaying point at which the operational information of the VP connector is written into the VP tracing cell, this VP tracing cell to have the operational information written thereinto is specified by referring to the information ("error flag") borne in the VP tracing cell in order to indicate the presence or absence of the error of the cell during the VP tracing operation, in addition to the end flag borne in the VP tracing cell.

As explained above, almost all the abnormal events concerning the VP tracing can be detected by operating and collating the error detecting code, collating the error flag, collating the cell serial No. information and monitoring the time-out. It is accordingly prevented to inform an OpS (operating system) of erroneous network operating information.

Practicable methods will be described below. First, there will be explained the format of the VP tracing cell which is processed by the VP trace processing circuit of the second embodiment. FIG. 5 illustrates an example of the format of the VP tracing cell. This VP tracing cell has a cell length of 53 [bytes], and it is composed of a header 30 being 5 [bytes] long and a payload area being 48 [bytes] long. The payload area includes OAM (operation and maintenance) cell sort information 31, write position information 32, control information 33, operational information storing areas 34-1 and 34-2, and an error detecting code 35. In more detail, the control information 33 contains an error flag 40, an end flag 41 and cell serial No. information 42. An error detecting code such as CRC (cyclic redundancy check) code is affixed as the error detecting code 35 in sending out the cell. The error flag 40 serves for error detection at the reception of the VP tracing cell, and indicates the occurrence of any error before the reception. The other areas are the same as the corresponding areas in the first embodiment, respectively. According to the cell format in the second embodiment, the operational information of two VP connectors can be borne in one VP tracing cell.

Figure 6:
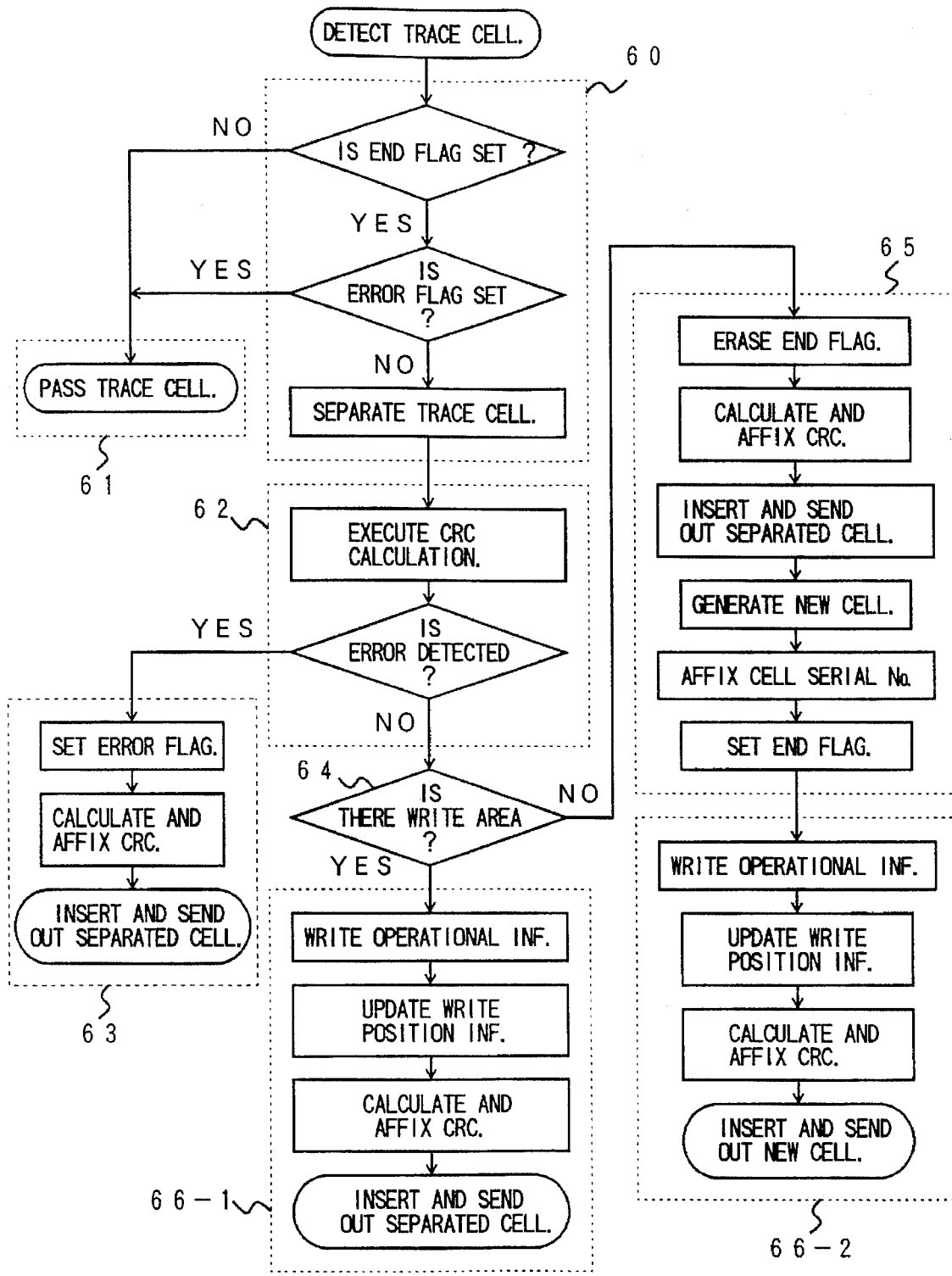
FIG. 6 is a flow chart showing an operational information writing process in the second embodiment.

FIG. 6 illustrates the flow of an operational information writing process in the second embodiment. The processing flow in FIG. 6 is broadly classified into an information writing cell-specifying process 60, a VP tracing cell-passing process 61, a VP tracing cell error-detecting process 62, an error flag setting process 63, a write area deciding process 64, a VP tracing cell-dividing process 65, and operational information writing processes 66-1 and 66-2. According to the processing flow shown in FIG. 6, the collected operational information are decided valid in the case where the reception sequence of the received OAM cell is consistent with the cell serial No. information borne in this cell, where the termination result of the error detecting code borne in the OAM cell is normal, and where the trace processing has ended with the arrival of the rearmost OAM cell at the VP connector serving as the final point of the tracing. Besides, at the tracing relaying point at which the operational information of the VP connector is written into the VP tracing cell, this VP tracing cell to have the operational information written thereinto is specified by referring to the information ("error flag") borne in the VP tracing cell in order to indicate the presence or absence of the error of the cell during the VP tracing operation, in addition to the end flag borne in the VP tracing cell.

As in the case of the first embodiment, the processing from the reception of the VP tracing cell till the sending thereof will be explained below in relation to the individual processes:

(2-1) Information writing cell-specifying process 60;

First of all, the trace cell detecting circuit 11 of the VP trace processing circuit detects whether or not the cell within the received cell stream is the VP tracing cell, by reference to the header 30 and the OAM sort information 31. In the case of the VP tracing cell, the control information detecting circuit 12 decides whether or not the pertinent cell is the rearmost one, by reference to the end flag 41 contained in the control information 33 of the cell. In the case where the received VP tracing cell is the rearmost one, the control information detecting circuit 12 decides whether or not any error has developed in the pertinent cell during the tracing, by reference to the set status of the error flag 40. When the error flag 40 is not set, the control information detecting circuit 12 decides the pertinent cell as having undergone no error, and it separates this cell from within the cell stream in the input highway 1 and directs the receiving buffer control circuit 13 to accumulate the separated cell in the receiving buffer 14. Simultaneously, the control information detecting circuit 12 directs the idle cell (or vacant cell) generating circuit 17 to generate an idle cell and insert the generated cell through the 3-1 selector 19, thereby to convert the VP tracing cell into the idle cell and to send out the latter to the output highway 3. Thereafter, the process 60 is followed by the VP tracing cell error-detecting process 62. On the other hand, in the case where the received cell is not the rearmost one or where the error flag 40 is set to indicate the presence of the error, the step of referring to the end flag 41 or the error flag 40 is followed by the VP tracing cell-passing process 61.

(2-2) VP tracing cell-passing process 61;

In the case where the received VP tracing cell is not the rearmost one or has undergone the error, it is subjected to quite no processing and is passed to the succeeding stage via the 3-1 selector 19, whereupon the whole processing is ended. That is, the 3-1 selector 19 allows the cell to pass therethrough when no selection instruction is given by the control information detecting circuit 12 or the transmitting buffer control circuit By the way, in the case where the received cell is not the VP tracing cell, it is passed before entering the operational information writing process.

(2-3) VP tracing cell error-detecting process 62;

The control information detecting circuit 12 executes the operation or calculation of an error detecting code (for example, the CRC code) as to the payload part of the VP tracing cell and collates the operated result with the error detecting code 35 affixed to the pertinent cell. Thus, the detecting circuit 12 decides whether or not the cell has undergone the error in the tracing between a VP connector at the preceding stage and the VP connector itself including this circuit 12. In case of the disagreement between the operated result and the error detecting code 35, the occurrence of the error is decided, whereupon the error detecting process 62 is followed by the error flag setting process 63.

In case of the agreement, the normal tracing is decided, whereupon the process 62 is followed by the write area deciding process 64.

(2-4) Error flag setting process 63;

In the case of the occurrence of the error, the error flag 40 of the separated VP tracing cell is set to indicate the presence of the error, an error detecting code is calculated as to the payload part of the pertinent cell, and the calculated result is affixed as the error detecting code 35 anew. Subsequently, the VP tracing cell is sent out through the transmitting buffer 16 as well as the 3-1 selector 19, in the form in which the idle cell is replaced with the VP tracing cell. Then, the operational information writing process is entirely ended.

(2-5) Write area deciding process 64;

The operational information affixing circuit 20 decides whether or not the area for writing the operational information thereinto remains in the separated VP tracing cell, by reference to the status of the write position information 32 of this cell. In a case where the write area remains, the process 64 is followed by the operational information writing process 66-1. On the other hand, in a case where the write area does not remain, the process 64 is followed by the VP tracing cell-dividing process 65.

(2-6) VP tracing cell-dividing process 65;

The operational information affixing circuit 20 rewrites the end flag 41 of the separated VP tracing cell so as to indicate the non-rearmost cell, calculates an error detecting code as to the payload part of the pertinent cell, and affixes the calculated result as the error detecting code 35 anew. Subsequently, the separated VP tracing cell is sent out through the transmitting buffer 16 as well as the 3-1 selector 19, in the form in which the idle cell is replaced with the VP tracing cell. Thereafter, a new VP tracing cell is generated in the operational information affixing circuit 20, the cell serial No. information is affixed to this cell, and the end flag 41 of this cell is set so as to indicate the rearmost cell. The cell serial No. information is affixed by monitoring the number of the passed VP tracing cells or the serial No. information of the separated VP tracing cell. The above processing is followed by the operational information writing process 66-2.

(2-7) Operational information writing process 66-1 or 66-2;

The operational information of the pertinent VP connector is written into the unused operational information storing area 34-1 or 34-2 of the VP tracing cell which has been separated or generated anew. At the next step, the write position information 32 is rewritten in accordance with the situation of use of the operational information storing area (s). By way of example, the write position information 32 indicates which of the operational information storing areas is used. Subsequently, an error detecting code is calculated as to the payload part of the pertinent cell, and the calculated result is affixed as the error detecting code 35. Thereafter, the VP tracing cell is sent out through the transmitting buffer 16 as well as the 3-1 selector 19 in the form in which the idle cell and the VP tracing cell are replaced with each other, in the same manner as in the case of the VP tracing cell-dividing process 65. After the above processing, the operational information writing process is entirely ended.

As understood from the processing contents explained above on the individual processes, the operational information writing flow of the second embodiment embraces the operational information writing flow of the first embodiment. As compared with the processing flow of the first embodiment, the processing flow of the second embodiment has the following merits:

① Since the error detecting code is affixed to the payload part, the error of the VP tracing cell having developed between the adjacent VP connectors can be detected.

② Owing to the provision of the error flag, the information on the error of the VP tracing cell detected by the upper-stream VP connector can be conveyed to the VP connector of the tracing termination point without fail.

③ The VP tracing cell whose error has been detected by the upper-stream VP connector, that is, the VP tracing cell whose error flag has been set can be excluded from the subject to have the operational information written thereinto and can be passed through the pertinent VP connector. Thus, the tracing at the occurrence of any abnormality can be finished promptly.

Figure 7:
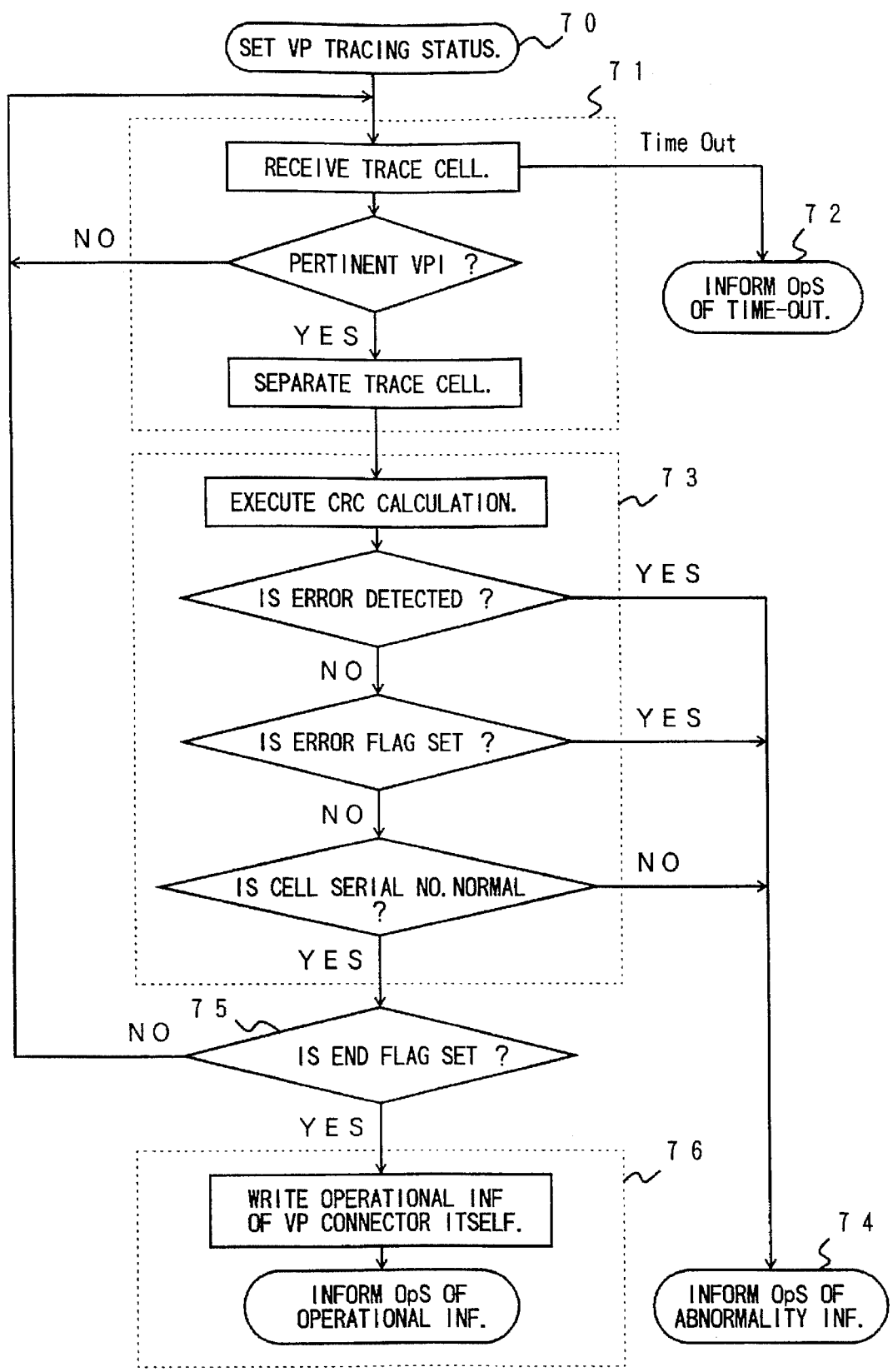
FIG. 7 is a flow chart showing a tracing terminating process in the third embodiment of the present invention.
Figure 8:
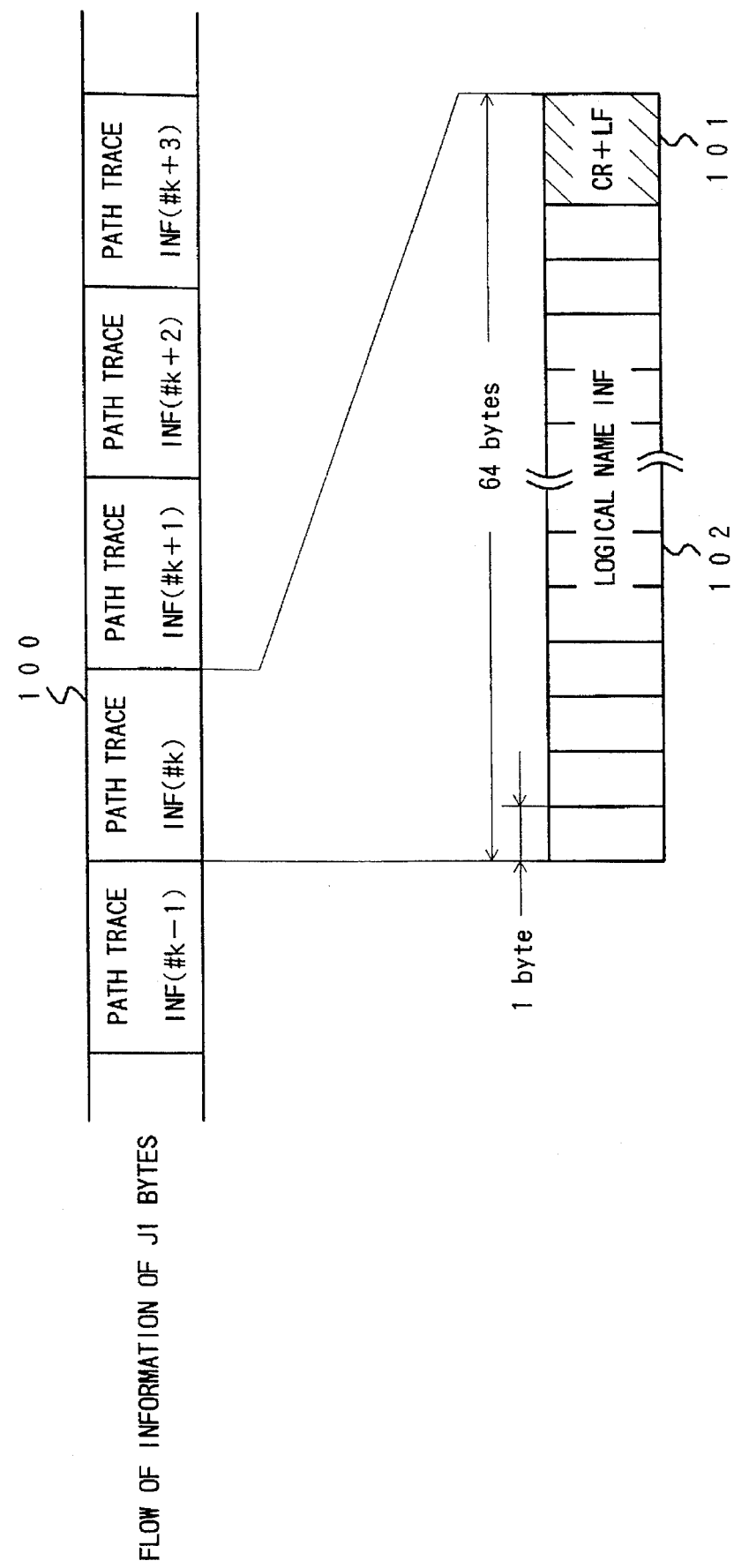
FIG. 8 is a diagram for explaining the format of path trace information in a method which is based on an SDH (synchronous digital hierarchy)
Figure 9:
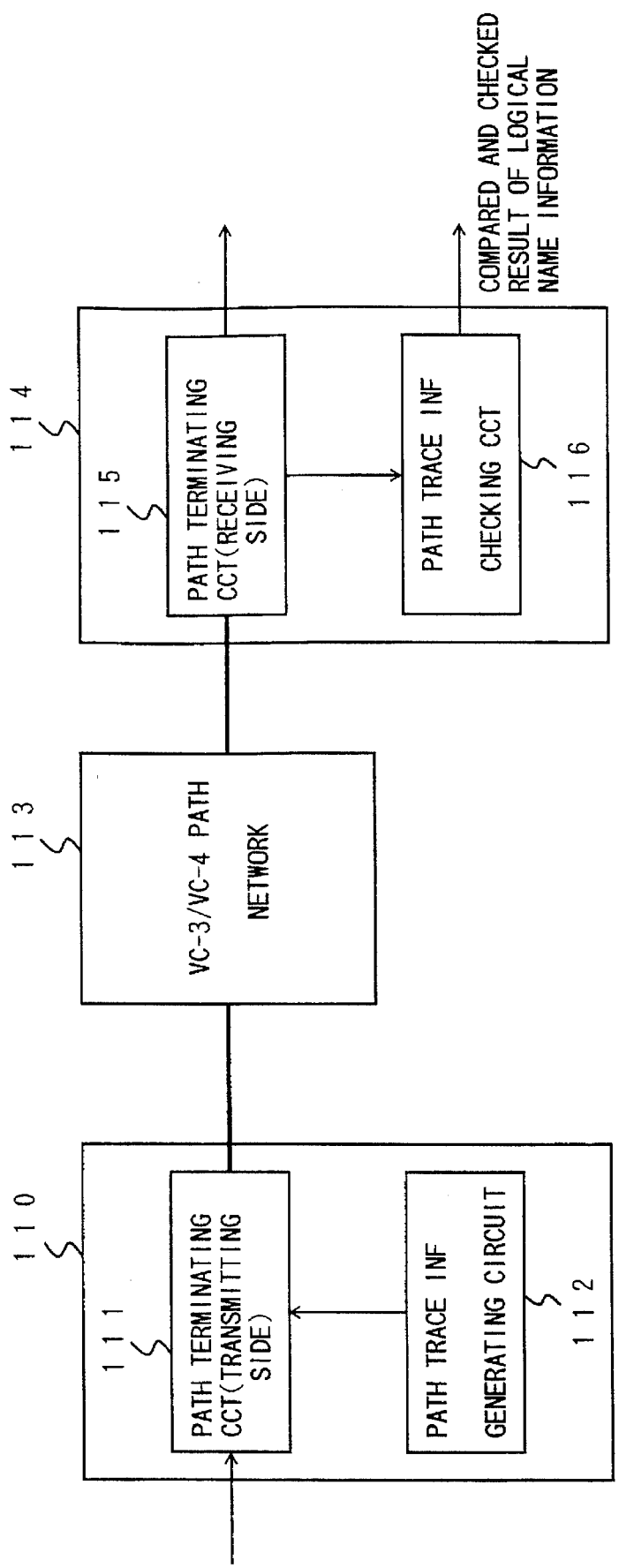
FIG. 9 is a diagram for explaining the form in which a path tracing function in the SDH is realized.
Figure 10:
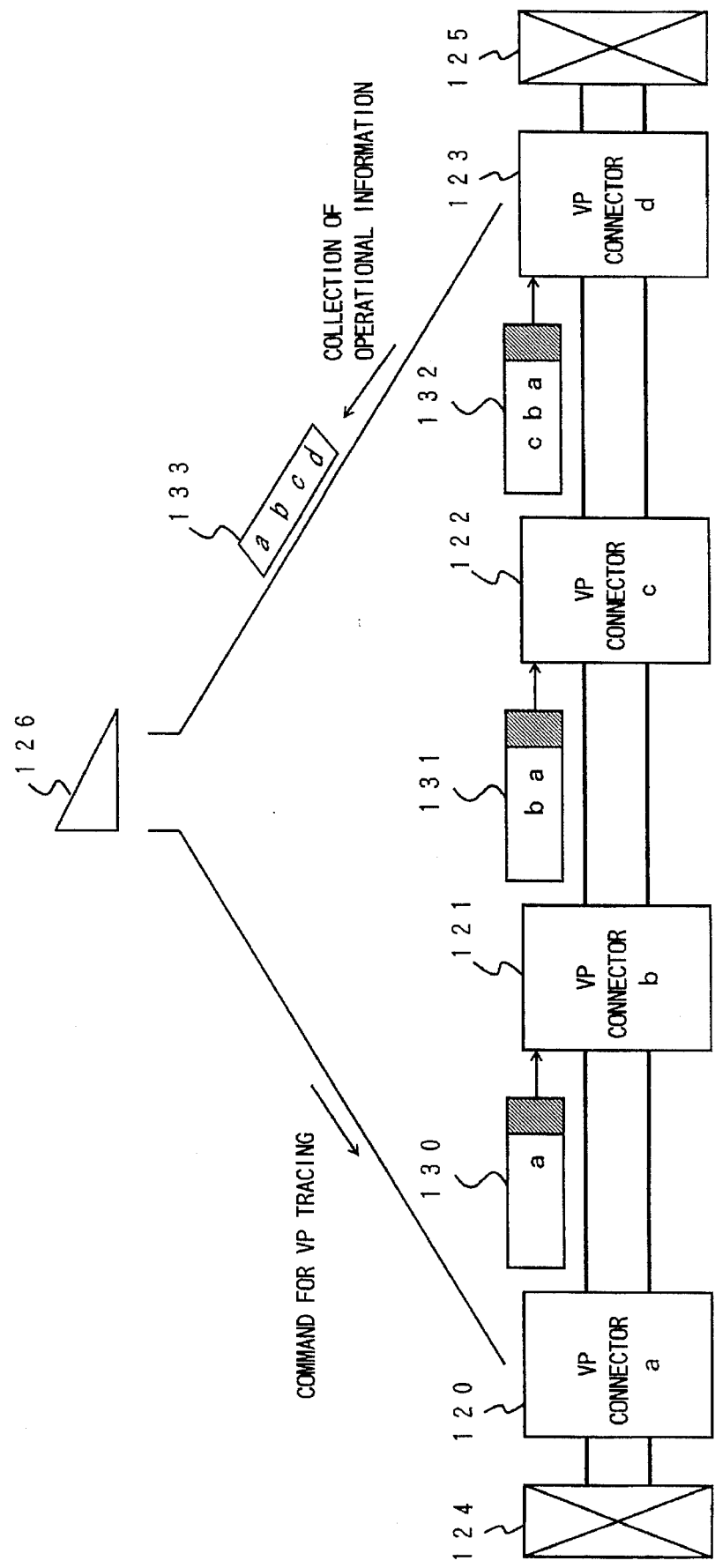
FIG. 10 is a diagram for explaining the form in which a VP tracing function in an ATM (asynchronous transfer mode) is realized.

Next, the third embodiment will be described with reference to FIG. 7. Whereas the first and second embodiments concern the processing at the tracing relaying point, the third embodiment concerns the processing at the tracing ending point. In this embodiment, there is indicated the processing method which decides the end of the VP tracing (mentioned as the problem (3) before). As an expedient for solving the third problem, it is set as a condition for ending the VP trace processing that the rearmost cell has arrived at the VP connector serving as the tracing ending point, or that a predetermined time period has lapsed since the start of the tracing. Besides, as a measure against the error and loss of the tracing cells (mentioned as the problem (4) before), the collected operational information are decided valid in a case where the reception sequence of the received OAM cell is consistent with the cell serial No. information borne in this cell, where the termination result of the error detecting code borne in the OAM cell is normal, and where the trace processing has ended with the arrival of the rearmost OAM cell at the VP connector serving as the final point of the tracing.

The processing from the start of the VP tracing till the end thereof will be explained below in relation to individual processes. A circuit arrangement which constructs the tracing ending point is such that the circuits relevant to the function of sending out the VP tracing cell are removed from the VP trace processing circuit of the tracing relaying point. Concretely, the idle cell detecting circuit 10, transmitting buffer control circuit 15 and transmitting buffer 16 are removed from the VP trace processing circuit shown in FIG. 1. Accordingly, the ensuing description shall be premised on the VP trace processing circuit shown in FIG. 1. In addition, the cell format in FIG. 5 left intact shall be applied as the format of the VP tracing cell.

(3-1) VP tracing-starting process 70;

A waiting status for the reception of the VP tracing cell is set for a VPI No. designated by the OpS (operating system), as a VP tracing-starting process 70, whereupon this process 70 is shifted to a VP tracing cell-waiting process 71. The VPI No. is that identification No. of a user cell which is affixed to a path tracing command when the OpS performs the path tracing.

(3-2) VP tracing cell-waiting process 71;

The trace cell detecting circuit 11 monitors the cell stream of the input highway 1, and detects the arrival of the VP tracing cell which bears the VPI No. set by the OpS. In a case where the pertinent VP tracing cell has been detected, it is separated and is accumulated in the receiving buffer 14, and the process 71 is shifted to a VP tracing cell abnormality-detecting process 73. Simultaneously with the monitoring of the cell stream, the trace cell detecting circuit 11 keeps an elapsed time since the start of the VP tracing. In a case where the predetermined time period has lapsed, the step of receiving the trace cell in the process 71 is followed by a time-out process 72.

(3-3) Time-out process 72;

The VP connector is resumed from the waiting status for the reception of the VP tracing cell, and it informs the OpS to the effect that the time-out process has been executed. Thereafter, the VP connector is restored into a status in which the VP tracing is not performed, and the tracing terminating process is entirely ended.

(3-4) VP tracing cell abnormality-detecting process 73;

The control information detecting circuit 12 executes the operation or calculation of the error detecting code as to the payload part of the separated VP tracing cell, and collates the operated result with the error detecting code 35 affixed to the pertinent cell. Thus, the detecting circuit 12 decides whether or not the cell has undergone any error in the tracing between a VP connector at the preceding stage and the VP connector itself including this circuit 12. In case of the disagreement between the operated result and the error detecting code 35, the occurrence of the error is decided, whereupon the step of detecting the error in the abnormality detecting process 73 is followed by a VP tracing abnormality-ending process 74. In case of the agreement, the error flag 40 included in the payload part is referred to, followed by the VP tracing abnormality-ending process 74 on condition that the error flag 40 is set to indicate the presence of the error. In a case where the error flag 40 is set to indicate the absence of the error, the cell serial No. information is further checked, followed by the VP tracing abnormality-ending process 74 on condition that the received cell lacks the serial No. or has duplicate serial Nos. In a case where the serial No. is checked to be normal, the abnormality detecting process 73 is shifted to a VP tracing ending-deciding process 75.

(3-5) VP tracing abnormality-ending process 74;

The VP connector is resumed from the waiting status for the reception of the VP tracing cell, and it informs the OpS of the content of the corresponding abnormality end. On this occasion, the occurrence of the error or the details of the error can be notified to the OpS. Thereafter, the VP connector is restored into the status in which the VP tracing is not performed, and the tracing terminating process is entirely ended.

(3-6) VP tracing ending-deciding process 75;

The control information detecting circuit 12 refers to the end flag 41 which is included in the payload part of the separated VP tracing cell. In a case where the separated cell has been decided the rearmost cell, the deciding process 75 is shifted to an operational information notifying process 76. On the other hand, in a case where the separated cell has been decided the non-rearmost cell, the deciding process 75 is shifted to the VP tracing cell-waiting process 71.

(3-7) Operational information notifying process 76;

The operational information of all the separated VP tracing cells are derived, the operational information of the tracing ending point is affixed to the derived operational information, and the resulting operational information are notified to the OpS. Thereafter, the VP connector is restored into the status in which the VP tracing is not performed, and the tracing terminating process is entirely ended.

As thus far explained, at the tracing ending point, the end of the VP tracing is fundamentally decided when all of the pluralized VP tracing cells have been received.

This is equivalent to deciding the end of the VP tracing on the basis of the reception of the rearmost cell for the VP tracing. Only with such a decisional condition, however, the reception of the rearmost VP tracing cell will be waited limitlessly if the event of the loss of this rearmost cell arises in the course of the VP trace processing. As the countermeasure, therefore, in a case where the rearmost VP tracing cell is not received in spite of the lapse of the predetermined time period since the start of the tracing, the VP trace processing is forcibly ended. The above predetermined time period depends upon the longest time period required for one VP trace processing in the ATM network which is the subject of the tracing. In this way, it is permitted to prevent the situation in which the VP trace processing is limitlessly continued at the tracing ending point. Further, almost all the abnormal events concerning the VP tracing can be detected by operating and collating the error detecting code, collating the error flag, collating the cell serial No. information and monitoring the time-out. It is accordingly prevented to inform the OpS of erroneous network operating information.

As understood from the processing contents explained above on the individual processes, the flow of the tracing terminating process of the third embodiment makes it possible to decide the end of the VP trace processing, to detect any abnormal operation in the VP tracing and to verify the propriety of the obtained operational information.

Figure 11:
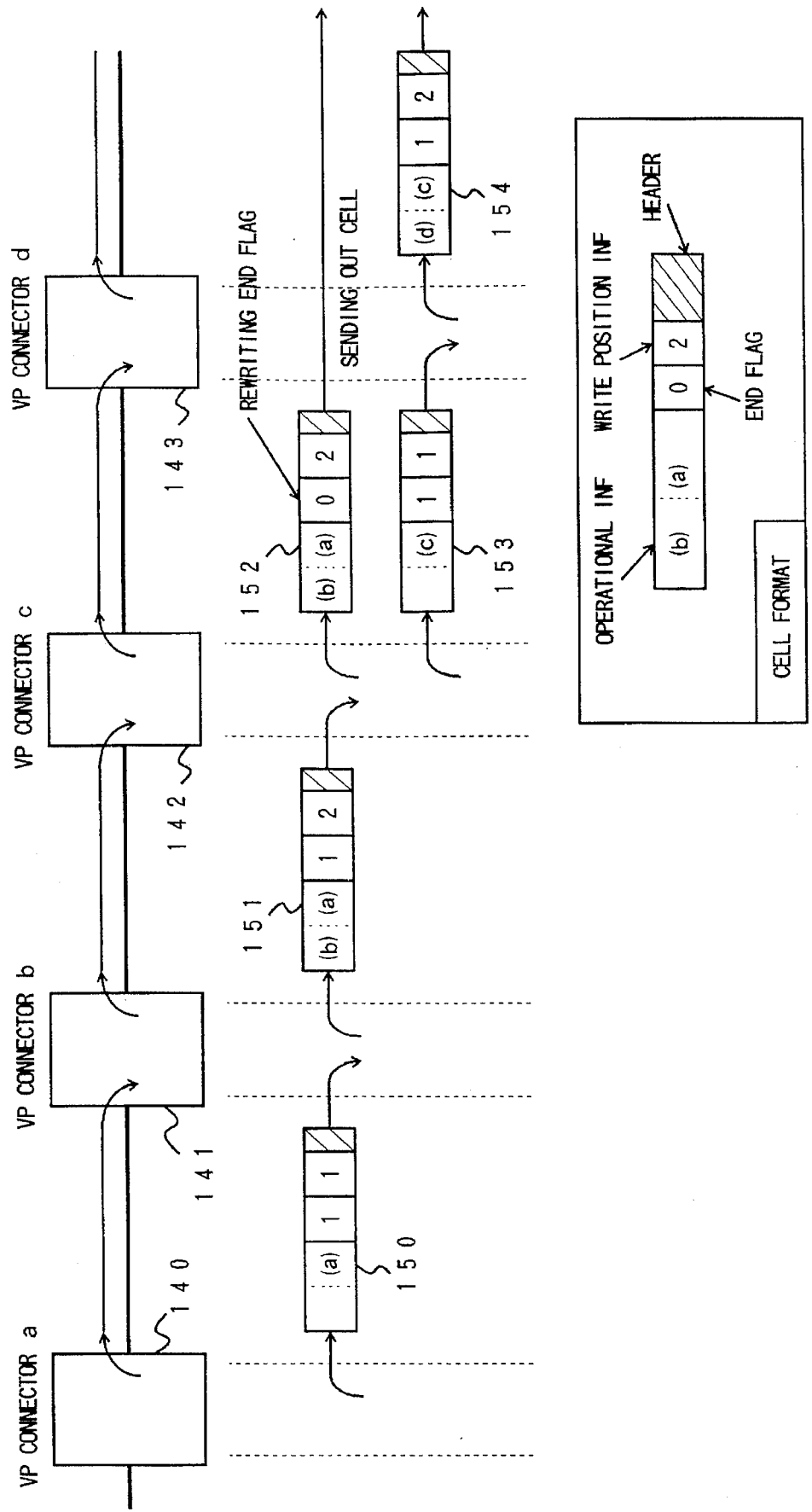
FIG. 11 is a diagram for explaining trace processing at a tracing relaying point.

Next, virtual path trace processing at each relaying point of an ATM network system will be described with reference to FIG. 11. This figure illustrates the trace processing in which one VP tracing cell is pluralized into two cells. In FIG. 11, "1" is set as the value of an end flag contained in the rearmost cell, and "0" as that of the end flag contained in the non-rearmost cell. Besides, one VP tracing cell can bear up to two operational information. It is in a VP connector 142 that the VP tracing cell is pluralized. On this occasion, the VP connector 142 separates the VP tracing cell 151 having the end flag "1" as received from a VP connector 141 and then refers to write position information contained in the separated cell 151, thereby to detect that the two operational information have already been borne. As a result, the VP connector 142 rewrites the end flag of the separated VP tracing cell 151 into "0" and sends out the resulting cell to the succeeding stage as the non-rearmost VP tracing cell 152. Thereafter, the VP connector 142 generates a cell anew, it affixes the end flag "1" to the cell and also writes its operational information c thereinto, and it sends out the resulting cell to the succeeding stage as the rearmost VP tracing cell 153. A VP connector 143 separates only the VP tracing cell 153 having the end flag "1", writes its operational information d into the separated cell, and sends out the resulting cell to the succeeding stage.

Meanwhile, a VP connector located at the tracing starting point of the ATM network system generates the VP tracing cell and sending out the generated cell to the ATM network under the command of the OpS, in addition to the execution of the trace processing at the relaying point stated above. Further, at the tracing ending point, the VP tracing cell is separated from the ATM network. and the operational information written in the separated cell is notified to the OpS, as in the description of the third embodiment.

As explained above, in an ATM (asynchronous transfer mode) network system having a plurality of VP (virtual path) connectors which establish a connection at a VP level and then perform processing for tracing VP's within a network wherein cells are transferred in the ATM; the VP connectors include a tracing starting VP connector which accepts a command for starting the tracing, and which affixes operational information for tracing the VP's as contained in the VP connector itself, to the OAM (operation and maintenance) cell and then sends out the resulting OAM cell; a tracing relaying VP connector which detects the OAM cell for tracing the VP's as received from another of the VP connectors, which operates when an area for affixing operational information contained in the VP connector itself exists in the detected OAM cell, to affix the operational information to the detected OAM cell and then send out the resulting OAM cell, and which operates when the area does not exist, to indicate in the received OAM cell that the received OAM cell is not the rearmost cell, and then send out the resulting OAM cell, to generate the OAM cell anew, to indicate in the OAM cell generated anew that the generated cell is the rearmost cell, and to affix the operational information to the generated cell and then send out the resulting cell; and a tracing ending VP connector which detects the OAM cell for tracing the VP's as received from another of the VP connectors, which ends the trace processing upon arrival of the rearmost OAM cell, and which derives and delivers the operational information of the OAM cells up to the rearmost OAM cell.

Further, the tracing starting VP connector affixes information indicative of a serial No. to the OAM cell for tracing the VP's and then sends out the resulting OAM cell; the tracing relaying VP connector refers to the serial No. information of the OAM cell received from the first-mentioned other VP, and affixes information indicative of a serial No. of the generated OAM cell and then sends out the resulting OAM cell in the case of having generated the OAM cell anew; and the tracing ending VP connector refers to the serial No. information of the OAM cells received from the other VP's, to judge if the OAM cells up to the rearmost OAM cell have arrived in conformity with the serial Nos., and it derives and delivers the operational information of the OAM cells up to the rearmost OAM cell when the serial Nos. are conformed to, whereas it gives notice of an abnormal end when not.

As stated before, the VP tracing cell can be pluralized by referring to the write position information and rewriting the end flag, so that the VP tracing can be executed.

According to the present invention, it is possible to provide a VP tracing connector and a network system which have an efficient processing algorithm for bearing the operational information of the VP connector in a plurality of VP tracing cells, and to readily realize the function of path tracing at a virtual path level.

What is claimed is:

1. A virtual path (VP) connector in an asynchronous transfer mode (ATM) network system in which a plurality of VP connectors, for relaying ATM cells sequentially according to a VP between two VP terminators, are arranged, said VP connectors also relay a series of operation and maintenance (OAM) cells as ATM cells in which operational information is entered, said VP connector comprising:

detection means for detecting and taking in a rearmost OAM cell of the series of OAM cells which are relayed according to the VP between the two VP terminators based on an end flag which has been set in said rearmost OAM cell of the series of OAM cells by a preceding VP connector or a VP terminator of the two VP terminators with respect to the VP;

judgement means for judging whether sufficient area exists in said rearmost OAM cell detected by said detection means for entering operational information in said rearmost OAM cell;

OAM cell generating means for generating a new OAM cell when said judgement means judges that sufficient area does not exist for entering the operational information in said rearmost OAM cell detected by said detection means; and operational information affixing means for, when said judgement means judges that sufficient area exists for entering the operational information in said rearmost OAM cell, entering the operational information in said rearmost OAM cell detected by said detection means, and relaying, according to the VP, said rearmost OAM cell in which said operational information has been entered, wherein, when said judgement means judges that sufficient area does not exist for entering the operational information in said rearmost OAM cell, said operational information affixing means enters the operational information in said new OAM cell generated by said OAM cell generating means, sets an end flag in said new OAM cell generated by said OAM cell generating means, resets the end flag in said rearmost OAM cell detected by said detection means and relays, according to the VP, said rearmost OAM cell in which the end flag has been reset and said new OAM cell in which the operational information has been entered.

2. A VP connector according to claim 1, wherein said operational information affixing means enters a serial number in said new OAM cell generated by said OAM cell generating means, said serial number representing an order of said new OAM cell in the series of OAM cells.

3. A VP connector according to claim 1, wherein said operational information affixing means decides a value of said serial number to be entered in said new OAM cell generated by said OAM cell generating means, based on a serial number which has been set in said rearmost OAM cell of the series of OAM cells by the preceding VP connector or the VP terminator of the two VP terminators with in respect to the VP.

4. A VP connector according to claim 1, wherein said operational information affixing means enters error detection information for detecting any errors generated during relaying of said rearmost OAM cell, and enters said error detection information in said new OAM cell generated by said OAM cell generating means for detecting any errors generated during relaying of said new OAM cell.

5. A VP connector according to claim 4, wherein said operational information affixing means comprises:

error detection means for detecting an error in said rearmost OAM cell based on said error detection information which has been set in said rearmost OAM cell of the series of OAM cells by a preceding VP connector or the VP terminator with respect to the VP; and means for setting an error flag in said rearmost OAM cell when said error of said rearmost OAM cell is detected by said error detection means, said detection means relaying said rearmost OAM cell instead of taking in said rearmost OAM cell in said VP connector when said error flag has been set in said rearmost OAM cell by a preceding VP connector or the VP terminator of the two VP terminators with respect to the VP.

6. A virtual path (VP) terminator in an asynchronous transfer mode (ATM) network system which includes an operating system for controlling a VP tracing, two VP terminators each of which receives an instruction of VP tracing operation from said operating system, and a plurality of VP connectors for relaying ATM cells sequentially according to a VP between said two VP terminators, said VP connectors also relay a series of operation and maintenance (OAM) cells as ATM cell in which operational information is entered, said VP terminator comprising:

reception means for receiving an instruction of starting of VP tracing from the operating system, wherein said VP terminator is an end point of the VP;

detection means for detecting a rearmost OAM cell of the series of OAM cells which are relayed from one of the VP connectors preceding VP terminator with respect to the VP; and reporting means for reporting, to the operating system, operational information entered in each of the OAM cells included in the series of OAM cells relayed from the VP connector preceding the VP terminator with respect to the VP, in response to a detection of said rearmost OAM cell by said detection means.

7. A VP terminator according to claim 6, wherein said reporting means reports, to said operating system, operational information entered in each of the OAM cells included in the series of OAM cells which have been relayed from the VP connector preceding the VP terminator with respect to the VP, in response to an occurrence of an event indicating that a predetermined time period starting at a time point when said reception means receives said instruction of starting of VP tracing has elapsed before said detection means detects said rearmost OAM cell of the series of OAM cells.

8. An asynchronous transfer mode (ATM) network system which includes an operating system for controlling a virtual path (VP) tracing, two VP terminators each of which receives an instruction of VP tracing operation from said operating system and a plurality of VP connectors for relaying ATM cells sequentially according to a VP between said two VP terminators, said VP connectors also relay a series of OAM cells each of which is an ATM cell in which operational information is entered, wherein the VP terminator being arranged at a start point of the VP comprises:

first reception means for receiving an instruction of starting of VP tracing in which the VP terminator is a start point of the VP from said operation system, and transmission means for transmitting, in response to reception of said instruction by said first reception means, an OAM cell including an end flag being set and operational information of the VP terminator at the start point of the VP, to the VP connector succeeding the VP terminator arranged at the start point of the VP;

wherein each of said VP connectors comprises:

first detection means for detecting a rearmost OAM cell of the series of OAM cells which are relayed, according to the VP, based on an end flag which has been set in said rearmost OAM cell of the series of OAM cells by a preceding VP connector or a VP terminator with respect to the VP, judgement means for judging whether sufficient area exists for entering operational information in said rearmost OAM cell detected by said first detection means, OAM cell generating means for generating a new OAM cell when said judgement means judges that sufficient area does not exist for entering said operational information in said rearmost OAM cell, and operational information affixing means for, when said judgement means judges that sufficient area exists for entering said operational information in said rearmost OAM cell, entering said operational information in said rearmost OAM cell detected by said first detection means and relaying, according to the VP, said rearmost OAM cell in which said operational information has been entered, wherein, when said judgement means judges that sufficient area does not exist for entering said operational information in said rearmost OAM cell, said operational information affixing means enters said operational information in said new OAM cell generated by said OAM cell generating means, sets an end flag in said new OAM cell generated by said OAM cell generating means, resets the end flag in said rearmost OAM cell detected by said detection means and relays, according to the VP, said rearmost OAM cell in which the end flag has been reset and said new OAM cell in which said operational information has been entered; and wherein, the VP terminator arranged at an end point of the VP comprises:

second reception means for receiving instruction of starting of VP tracing in which the VP terminator is an end point of the VP from said operation system, second detection means for detecting said rearmost OAM cell of the series of OAM cells which are relayed from a VP connector preceding the VP terminator with respect to the VP based on an end flag which has been set in said rearmost OAM cell of the series of OAM cells by a previous VP connector or a VP terminator of the two VP terminators with respect to the VP, and reporting means for reporting, to said operating system, operational information entered in each of the OAM cells included in the series of OAM cells relayed from the VP connector preceding the VP terminator with respect to the VP, in response to a detection of said rearmost OAM cell by said second detection means.

9. An ATM network system according to claim 8, wherein the VP terminator arranged at the start point of the VP further comprises:

means for entering a serial number in the OAM cell to be transmitted by said transmission means;

wherein said operational information affixing means of each of said VP connectors enters a serial number into said new OAM cell generated by OAM cell generating means based on a serial number which has been set in said rearmost OAM cell of the series of OAM cells by the preceding VP connector or the VP terminator of the two VP terminators with respect to the VP;

wherein said reporting means of the VP terminator arranged at an end point of the VP reports an abnormality to said operating system when each of the OAM cells of the series of OAM cells is not relayed in accordance with said serial number order from the VP connector preceding the VP terminator at the end point, said serial number representing an order of the OAM cell in the series of OAM cells.

10. A method in a virtual path (VP) connector in an asynchronous transfer mode (ATM) network system in which a plurality of VP connectors, for relaying ATM cells sequentially according to a VP between two VP terminators, are arranged, said VP connectors also relaying a series of OAM cells each of which is an ATM cell in which operational information is entered, comprising:

a detection step for detecting and taking in a rearmost OAM cell of the series of OAM cells which are relayed according to the VP based on an end flag which has been set in said rearmost OAM cell of the series of OAM cells by a preceding VP connector or a VP terminator with respect to the VP;

a judgement step for judging whether sufficient area exists for entering operational information in said rearmost OAM cell detected by said detection step;

an OAM cell generating step for generating a new OAM cell when said judgement step judges that sufficient area does not exist for entering the operational information in the rearmost OAM cell; and an operational information affixing step for, when said judgement step judges that sufficient area exists for entering the operational information in said rearmost OAM cell, entering the operational information in said rearmost OAM cell detected by said detection step and relaying, according to the VP, said rearmost OAM cell in which the operational information has been entered, wherein, when said judgement step judges that sufficient area does not exist for entering the operational information in said rearmost OAM cell, said operational information affixing step enters the operational information in said new OAM cell generated by OAM cell generating step, sets an end flag in said new OAM cell generated by OAM cell generating step, resets the end flag in said rearmost OAM cell detected by said detection step and relays, according to the VP, said rearmost OAM cell in which the end flag has been reset and said new OAM cell in which the operational information has been entered.

11. A format of a cell included in a series of cells for tracing virtual path (VP), the cell being used for collecting operational information of connectors which establish a connection at a VP level within a network wherein the cell is transferred in an asynchronous transfer mode (ATM) wherein said cell for VP tracing contains an area for an end flag which indicates that each cell is a rearmost cell of a series of currently existing cells for said VP tracing.

12. A format of a cell according to claim 11, wherein said cell for said VP tracing contains an area for a serial number, said serial number indicating an order of said cell in said series of currently existing cells of said VP tracing.

13. A format of a cell according to claim 12, wherein said cell for said VP tracing contains an area for an error flag which indicates presence or absence of an error in said cell under said VP tracing.

14. A virtual path (VP) terminator in an asynchronous transfer mode (ATM) network system which includes an operating system for controlling a VP tracing operation, two of VP terminators each of which receives an instruction of VP tracing operation from said operating system, and a plurality of VP connectors for relaying ATM cells sequentially according to a VP between said two of VP terminators, said VP connectors also relay a series of operation and maintenance (OAM) cells as ATM cell in which operational information is entered, said VP terminator comprising:

reception means for receiving an instruction of starting of an operation in VP tracing wherein the VP terminator is assigned as an end point of the VP tracing, from said operation system;

detection means for executing a detection of a rearmost OAM cell of the series of the OAM cells which are relayed from one of the VP connectors preceding VP terminator with respect to said VP, said detection is started in response to a reception of said instruction at said reception means; and reporting means for reporting, to said operating system, the operational information entered in each of the OAM cells included in the series of OAM cells relayed from the VP connector preceding the VP terminator with respect to said VP, in response to detection of the rearmost OAM cell of the series of the OAM cells before a predetermined time period starting at a time point when said reception means receives said instruction has elapsed, wherein said reporting means reports, to said operating system, operational information entered in each of the OAM cells included in the series of OAM cells which have been relayed from the VP connector preceding the VP terminator with respect to said VP, in response to an occurrence of event indicating that said predetermined time period starting at a time point when said reception means receives said instruction has elapsed before said detection means detects the rearmost OAM cell of the series of the OAM cells.

15. A virtual path (VP) connector in an asynchronous transfer mode (ATM) network system in which a plurality of VP connectors, for relaying ATM cells sequentially according to a VP (virtual path) between two of VP terminators, are arranged, said VP connectors also relaying a series of operation and maintenance (OAM) cells as ATM cells in which operational information is entered, comprising:

detection means for detecting and taking in a rearmost OAM cell of said series of the OAM cells which are relayed to the VP connector according to said VP, based on an end flag which has been set in said rearmost OAM cell of said series of the OAM cells by a preceding VP connector or the VP terminator with respect to said VP;

judgement means for judging whether sufficient area exists in said rearmost cell taken in by said detection means for entering the operational information in said rearmost OAM cell;

OAM cell generating means for generating a new OAM cell when said judgement means judges that sufficient area does not exist for entering the operational information in the rearmost OAM cell taken in by said detection means; and operational information affixing means for, when said judgement means judges that sufficient area exists for entering the operational information in the rearmost OAM cell, entering the operational information in the rearmost OAM cell taken in by said detection means, entering error detection information for detecting any errors of the OAM cell under the relaying in the rearmost cell taken in by said detection means, and relaying, according to said VP, said rearmost OAM cell in which said operational information has been entered, wherein, when said judgement means judges that sufficient area does not exist for entering the operational information in the rearmost OAM cell, said operational information affixing means enters the operational information in said new OAM cell generated by said OAM cell generating means, sets the end flag in the new OAM cell generated by said OAM cell generating means, resets the end flag in the rearmost OAM cell taken in by said detection means, enters error detection information for detecting any errors of the OAM cell under the relaying in the rearmost cell taken in by said detection means, enters the error detection information in said new OAM cell generated by said OAM cell generating means, and relays, according to said VP, the rearmost OAM cell in which the end flag has been reset and said new OAM cell in which said operational information has been entered and, thereby said new OAM cell becomes a new rearmost OAM cell of said series of the OAM cells.

16. A VP (virtual path) connector defined in claim 15, wherein said operational information affixing means comprises:

error detection means for detecting an error in said rearmost OAM cell taken in by said detection means, based on the error detection information which has been set in said rearmost OAM cell by a preceding VP connector or the VP terminator with respect to said VP; and means for setting an error flag in the rearmost OAM cell when the error of said rearmost OAM cell is detected by said error detection means, wherein said detection means relays the detected rearmost OAM cell instead of taking in the rearmost OAM cell in said VP connector when the error flag has been set in said rearmost OAM cell by a preceding VP connector or the VP terminator with respect to the VP.

17. An asynchronous transfer mode (ATM) network system which includes an operating system for controlling a virtual path (VP) tracing, two of VP terminators each of which receives an instruction of VP tracing operation from said operating system and a plurality of VP connectors for relaying ATM cells sequentially according to a VP between said two of VP terminators, said VP connectors also relaying a series of operation and maintenance (OAM) cells each of which is an ATM cell in which operational information is entered, wherein the VP terminator being arranged at a start point of the VP comprises:

first reception means for receiving an instruction of starting of an operation in VP tracing in which the VP terminator is a start point of the VP from said operation system, and transmission means for transmitting, in response to the reception of said instruction by said first reception means, an OAM cell including an end flag being set and operational information of the VP terminator at the start point of the VP, to the VP connector arranged succeeding the VP terminator arranged at the start point of the VP;

wherein each of said VP connectors comprises:

first detection means for detecting a rearmost OAM cell of the series of the OAM cells which are relayed, according to the VP, based on an end flag which has been set in said rearmost OAM cell of said series of the OAM cells by a preceding VP connector or the VP terminator with respect to the VP, judgement means for judging whether sufficient area exists for entering the operational information in said rearmost OAM cell taken in by said first detection means, OAM cell generating means for generating a new OAM cell when said judgement means judges that sufficient area does not exist for entering the operational information in said rearmost OAM cell, and operational information affixing means for, when said judgement means judges that sufficient area exists for entering said operational information in said rearmost OAM cell, entering the operational information in said rearmost OAM cell and relaying, according to said VP, the rearmost OAM cell in which said operational information has been entered;

wherein, when said judgement means judges that sufficient area does not exist for entering said operational information in said rearmost OAM cell, said operational information affixing means enters said operational information in said new OAM cell generated by said OAM cell generating means, sets an end flag in said new OAM cell generated by said OAM cell generating means, resets the end flag in said rearmost OAM cell taken in by said detection means and relays, according to said VP, the rearmost OAM cell in which the end flag has been reset and said new OAM cell in which said operational information has been entered;

wherein the VP terminator arranged at an end point of the VP comprises:

second reception means for receiving instruction of starting of an operation in VP tracing in which the VP terminator is an end point of the VP from said operation system, second detection means for detecting the rearmost OAM cell of the series of the OAM cells which are relayed from the VP connector preceding the VP terminator with respect to said VP, based on an end flag which has been set in said rearmost OAM cell of the series of the OAM cells by the previous VP connector with respect to the VP or the VP terminator arranged at the start point of the VP tracing, and reporting means for reporting, to said operating system, the operational information entered in each of the OAM cells included in the series of OAM cells relayed from the VP connector preceding the VP terminator with respect to said VP, in response to a detection of the rearmost OAM cell in said detection means;

wherein said VP terminator arranged at a start point of the VP comprises means for entering a serial number in the OAM cell to be transmitted by said transmission means;

wherein said operational information affixing means of each of said VP connectors enters a serial number in said new OAM cell generated by OAM cell generating means, based on the serial number which has been set in said rearmost OAM cell of said series of the OAM cells by the preceding VP connector with respect to said VP or the VP terminator arranged at the start point of the VP tracing;

wherein said reporting means of said VP terminator arranged at an end point of the VP reports an abnormality to said operating system when each of the OAM cells of the series of the OAM cells is not relayed to the VP terminator at said end point in accordance with said serial number order from the VP connector preceding the VP terminator at the end point; and wherein said serial number represents an order of the OAM cell in said series of the OAM cells.

* * * * *